US008622814B2

(12) United States Patent
Englman et al.

(10) Patent No.: US 8,622,814 B2
(45) Date of Patent: Jan. 7, 2014

(54) GAMING MACHINE HAVING A COMMUNITY GAME WITH SIDE WAGERING

(75) Inventors: Allon G. Englman, Chicago, IL (US); Larry J. Pacey, Chicago, IL (US); Peter R. Anderson, Glenview, IL (US); Jeremy M. Hornik, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 584 days.

(21) Appl. No.: 12/827,474

(22) Filed: Jun. 30, 2010

(65) Prior Publication Data

US 2010/0267442 A1 Oct. 21, 2010

Related U.S. Application Data

(63) Continuation of application No. 11/223,296, filed on Sep. 9, 2005, now Pat. No. 7,780,531, which is a continuation-in-part of application No. 10/612,478, filed on Jul. 2, 2003, now Pat. No. 7,662,040, and a continuation-in-part of application No. PCT/US2005/015687, filed on May 5, 2005.

(60) Provisional application No. 60/570,583, filed on May 13, 2004.

(51) Int. Cl.
*A63F 9/24* (2006.01)
*A63F 13/00* (2006.01)

(52) U.S. Cl.
USPC .................. 463/25; 463/20; 463/26; 463/30; 463/42

(58) Field of Classification Search
USPC ............................................... 463/16, 25, 42
See application file for complete search history.

(56) References Cited

U.S. PATENT DOCUMENTS

| | | | | |
|---|---|---|---|---|
| 4,624,459 | A | 11/1986 | Kaufman | 273/143 R |
| 4,837,728 | A | 6/1989 | Barrie et al. | 364/412 |

(Continued)

FOREIGN PATENT DOCUMENTS

| | | | | |
|---|---|---|---|---|
| CA | 2334546 A1 | 8/2001 | | G01F 17/34 |
| DE | 195 15 983 A1 | 11/1996 | | G07F 17/34 |

(Continued)

OTHER PUBLICATIONS

Article for "Easy Riches" by Sigma Game, Strictly Slots, 1 page (Aug. 2001).
Article for "Millioniser" by Glenn Haussman, Strictly Slots, pp. 50-53 (Mar. 2004).
Product Sheet for "Big Games Safari," IGT, 24 pages (2000).
"New '97 Games," International Gaming & Wagering Business, 24 pages (Mar. 1997).

(Continued)

*Primary Examiner* — William Brewster
*Assistant Examiner* — Andrew Kim
(74) *Attorney, Agent, or Firm* — Nixon Peabody LLP

(57) ABSTRACT

A gaming system includes at least one community display, a first gaming machine, and a second gaming machine. The at least one community display displays a communal game that includes a plurality of elements. At least some of the plurality of elements have a communal value associated therewith. The first and second gaming machines have a respective first and second video display for displaying the plurality of elements. At least some of the plurality of elements have a first and second player value associated therewith. The first and second gaming machines determine the first and second player values by applying a respective first and second value-enhancement parameter to the communal values associated with at least some of the plurality of elements. The first value-enhancement parameter is different than the second value-enhancement parameter.

24 Claims, 12 Drawing Sheets

(56) References Cited

U.S. PATENT DOCUMENTS

| | | | | |
|---|---|---|---|---|
| 4,861,041 | A | 8/1989 | Jones et al. | 273/292 |
| 4,948,134 | A | 8/1990 | Suttle et al. | 273/85 |
| 5,116,055 | A | 5/1992 | Tracy | 273/138 A |
| 5,249,800 | A | 10/1993 | Hilgendorf et al. | 273/138 A |
| 5,275,400 | A | 1/1994 | Weingardt | 273/85 |
| 5,280,909 | A | 1/1994 | Tracy | 273/138 A |
| 5,344,144 | A | 9/1994 | Canon | 273/138 A |
| 5,377,973 | A | 1/1995 | Jones et al. | 273/85 CP |
| 5,393,057 | A | 2/1995 | Marnell, II | 273/85 CP |
| 5,417,430 | A | 5/1995 | Breeding | 273/292 |
| 5,482,289 | A | 1/1996 | Weingardt | 273/269 |
| 5,524,888 | A | 6/1996 | Heidel | 463/22 |
| 5,544,892 | A | 8/1996 | Breeding | 273/292 |
| 5,554,892 | A | 9/1996 | Norimatsu | 307/115 |
| 5,564,700 | A | 10/1996 | Celona | 463/27 |
| 5,577,731 | A | 11/1996 | Jones | 273/292 |
| 5,577,959 | A | 11/1996 | Takemoto | 463/25 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,645,486 | A | 7/1997 | Nagao et al. | 463/27 |
| 5,647,592 | A | 7/1997 | Gerow | 463/139 |
| 5,655,961 | A | 8/1997 | Acres et al. | 463/27 |
| 5,722,890 | A | 3/1998 | Libby et al. | 463/17 |
| 5,743,800 | A | 4/1998 | Huard et al. | 463/26 |
| 5,766,076 | A | 6/1998 | Pease et al. | 463/27 |
| RE35,864 | E | 7/1998 | Weingardt | 463/27 |
| 5,779,549 | A | 7/1998 | Walker et al. | 463/42 |
| 5,816,918 | A | 10/1998 | Kelly et al. | 463/16 |
| 5,820,459 | A | 10/1998 | Acres et al. | 463/25 |
| 5,823,874 | A | 10/1998 | Adams | 463/17 |
| 5,830,063 | A | 11/1998 | Byrne | 463/25 |
| 5,839,956 | A | 11/1998 | Takemoto | 463/18 |
| 5,842,698 | A | 12/1998 | Brown | 273/292 |
| 5,848,932 | A | 12/1998 | Adams | 463/20 |
| 5,851,011 | A | 12/1998 | Lott | 273/292 |
| 5,851,147 | A | 12/1998 | Stupak | 463/13 |
| 5,855,515 | A | 1/1999 | Pease et al. | 463/27 |
| 5,876,284 | A | 3/1999 | Acres et al. | 463/25 |
| 5,885,158 | A | 3/1999 | Torango et al. | 463/25 |
| 5,941,773 | A | 8/1999 | Harlick | 463/26 |
| 5,944,606 | A | 8/1999 | Gerow | 463/27 |
| 5,951,011 | A | 9/1999 | Potter et al. | 273/292 |
| 5,975,528 | A | 11/1999 | Halaby | 273/148 |
| 5,993,316 | A | 11/1999 | Coyle et al. | 463/25 |
| 6,000,699 | A | 12/1999 | Long | 273/292 |
| 6,003,013 | A | 12/1999 | Boushy et al. | 705/10 |
| 6,007,427 | A | 12/1999 | Wiener et al. | 463/17 |
| 6,012,982 | A | 1/2000 | Piechowiak et al. | 463/16 |
| 6,020,884 | A | 2/2000 | MacNaughton et al. | 345/329 |
| 6,032,955 | A | 3/2000 | Luciano et al. | 273/138.1 |
| 6,039,648 | A | 3/2000 | Guinn et al. | 463/16 |
| 6,047,963 | A | 4/2000 | Pierce et al. | 273/121 B |
| 6,077,162 | A | 6/2000 | Weiss | 463/26 |
| 6,089,976 | A | 7/2000 | Schnieder et al. | 463/16 |
| 6,089,977 | A | 7/2000 | Bennett | 463/20 |
| 6,089,980 | A | 7/2000 | Gauselmann | 463/27 |
| 6,102,474 | A | 8/2000 | Daley | 296/836 |
| 6,102,798 | A | 8/2000 | Bennett | 463/16 |
| 6,102,799 | A | 8/2000 | Stupak | 463/27 |
| 6,105,964 | A | 8/2000 | Maahs | 273/292 |
| 6,110,043 | A | 8/2000 | Olsen | 463/27 |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,164,651 | A | 12/2000 | Webb | 273/274 |
| 6,168,155 | B1 | 1/2001 | Kuhlman et al. | 273/144 |
| 6,168,523 | B1 | 1/2001 | Piechowiak et al. | 463/26 |
| 6,203,010 | B1 | 3/2001 | Jorasch et al. | 273/138.1 |
| 6,203,429 | B1 | 3/2001 | Demar et al. | 463/20 |
| 6,206,374 | B1 | 3/2001 | Jones | 463/26 |
| 6,206,782 | B1 | 3/2001 | Walker et al. | 463/25 |
| 6,210,275 | B1 | 4/2001 | Olsen | 463/16 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,482 | B1 | 5/2001 | Bennett | 463/20 |
| 6,224,484 | B1 | 5/2001 | Okuda et al. | 463/27 |
| 6,231,445 | B1 | 5/2001 | Acres | 463/27 |
| 6,241,608 | B1 | 6/2001 | Torango | 463/27 |
| 6,254,483 | B1 | 7/2001 | Acres | 463/26 |
| 6,299,533 | B1 | 10/2001 | Parra et al. | 463/17 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,331,148 | B1 | 12/2001 | Krause et al. | 473/274 |
| 6,336,857 | B1 | 1/2002 | McBride | 463/12 |
| 6,336,859 | B2 | 1/2002 | Jones et al. | 463/42 |
| 6,336,862 | B1 | 1/2002 | Byrne | 463/27 |
| 6,345,824 | B1 | 2/2002 | Selitzky | 273/292 |
| 6,347,996 | B1 | 2/2002 | Gilmore et al. | 463/17 |
| 6,352,479 | B1 | 3/2002 | Sparks, II | 463/42 |
| 6,358,149 | B1 | 3/2002 | Schneider et al. | 463/27 |
| 6,361,441 | B1 | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,406,369 | B1 | 6/2002 | Baerlocher et al. | 463/20 |
| 6,409,602 | B1 | 6/2002 | Wiltshire et al. | 463/42 |
| 6,416,408 | B2 | 7/2002 | Tracy et al. | 463/29 |
| 6,416,409 | B1 | 7/2002 | Jordan | 463/27 |
| 6,422,940 | B1 | 7/2002 | Walker et al. | 463/13 |
| 6,431,983 | B2 | 8/2002 | Acres | 463/25 |
| 6,435,510 | B2 | 8/2002 | Moore | 273/292 |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |
| 6,506,117 | B2 | 1/2003 | DeMar et al. | 463/20 |
| 6,508,707 | B2 | 1/2003 | DeMar et al. | 463/16 |
| 6,508,709 | B1 | 1/2003 | Karmarkar | 463/42 |
| 6,517,073 | B1 | 2/2003 | Vancura | 273/274 |
| 6,517,433 | B2 | 2/2003 | Loose et al. | 463/20 |
| 6,520,855 | B2 | 2/2003 | DeMar et al. | 463/20 |
| 6,569,016 | B1 | 5/2003 | Baerlocher | 463/16 |
| 6,577,733 | B1 | 6/2003 | Charrin | 380/251 |
| 6,589,115 | B2 | 7/2003 | Walker et al. | 463/25 |
| 6,592,458 | B1 | 7/2003 | Ho | 463/17 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,193 | B2 | 7/2003 | Baerlocher et al. | 463/27 |
| 6,601,771 | B2 | 8/2003 | Charrin | 235/492 |
| 6,609,673 | B1 | 8/2003 | Johnson | 242/423 |
| 6,626,758 | B1 | 9/2003 | Parham et al. | 463/25 |
| 6,648,753 | B1 | 11/2003 | Tracy et al. | 463/16 |
| 6,648,762 | B2 | 11/2003 | Walker et al. | 463/25 |
| 6,652,378 | B2 | 11/2003 | Cannon et al. | 463/20 |
| 6,656,052 | B2 | 12/2003 | Abramopoulos et al. | 463/47 |
| 6,676,513 | B2 | 1/2004 | Gauselmann | 463/20 |
| 6,685,560 | B1 | 2/2004 | Hughes | 463/16 |
| 6,692,353 | B2 | 2/2004 | Walker et al. | 463/30 |
| 6,712,695 | B2 | 3/2004 | Mothwurf et al. | 463/25 |
| 6,712,699 | B2 | 3/2004 | Walker et al. | 463/42 |
| 6,733,390 | B2 | 5/2004 | Walker et al. | 463/23 |
| 6,755,741 | B1 | 6/2004 | Rafaeli | 463/25 |
| 6,776,715 | B2 | 8/2004 | Price | 463/27 |
| 6,790,141 | B2 | 9/2004 | Muir | 463/42 |
| 6,837,793 | B2 | 1/2005 | McClintic | 463/42 |
| 6,869,361 | B2 | 3/2005 | Sharpless | 463/25 |
| 6,880,824 | B2 | 4/2005 | Thiinnes | 273/139 |
| 6,887,154 | B1 | 5/2005 | Luciano, Jr. et al. | 463/26 |
| 6,887,159 | B2 | 5/2005 | Leen et al. | 463/42 |
| 7,004,466 | B2 | 2/2006 | Gauselmann | 463/138 |
| 7,036,012 | B2 | 4/2006 | Charrin | 213/169 |
| 7,056,215 | B1 | 6/2006 | Olive | 463/27 |
| 7,169,041 | B2 | 1/2007 | Tessmer et al. | 463/16 |
| 7,255,645 | B2 | 8/2007 | Steil et al. | 463/27 |
| 7,311,604 | B2 | 12/2007 | Kaminkow et al. | 463/20 |
| 7,448,949 | B2 | 11/2008 | Kaminkow et al. | 463/26 |
| 7,666,092 | B2 | 2/2010 | Kaminkow et al. | 463/25 |

(56) References Cited

U.S. PATENT DOCUMENTS

| | | | | |
|---|---|---|---|---|
| 7,854,654 | B2 | 12/2010 | Baerlocher et al. | 463/27 |
| 7,892,093 | B2 | 2/2011 | Kniesteadt et al. | 463/25 |
| 7,963,847 | B2 | 6/2011 | Baerlocher | 463/27 |
| 2002/0006822 | A1 | 1/2002 | Krintzman | 463/27 |
| 2002/0132660 | A1 | 9/2002 | Taylor | 463/16 |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2002/0187823 | A1 | 12/2002 | Khal | 463/13 |
| 2003/0014370 | A1 | 1/2003 | Charrin | 17/60 |
| 2003/0027618 | A1 | 2/2003 | Byrne | 463/16 |
| 2003/0027625 | A1 | 2/2003 | Rowe | 463/20 |
| 2003/0030211 | A1 | 2/2003 | Brown | 273/139 |
| 2003/0036430 | A1 | 2/2003 | Cannon | 463/42 |
| 2003/0045337 | A1 | 3/2003 | Byrne | 463/16 |
| 2003/0047874 | A1 | 3/2003 | Leen et al. | 273/292 |
| 2003/0050106 | A1 | 3/2003 | Lyfoung | 463/13 |
| 2003/0060106 | A1 | 3/2003 | Haggquist et al. | 442/131 |
| 2003/0060266 | A1 | 3/2003 | Baerlocher | 463/20 |
| 2003/0064776 | A1 | 4/2003 | Byrne | 463/16 |
| 2003/0064807 | A1 | 4/2003 | Walker | 463/42 |
| 2003/0078091 | A1 | 4/2003 | Brandstetter et al. | 463/20 |
| 2003/0100360 | A1* | 5/2003 | Manfredi et al. | 463/25 |
| 2003/0109306 | A1 | 6/2003 | Karmakar | 463/40 |
| 2003/0114218 | A1 | 6/2003 | McClintic | 463/25 |
| 2003/0119576 | A1 | 6/2003 | McClintic | 463/20 |
| 2003/0148807 | A1 | 8/2003 | Acres | 463/26 |
| 2003/0148808 | A1 | 8/2003 | Price | 463/27 |
| 2003/0157978 | A1 | 8/2003 | Englman | 463/16 |
| 2003/0181231 | A1 | 9/2003 | Vancura et al. | 463/9 |
| 2003/0186733 | A1 | 10/2003 | Wolf et al. | 463/16 |
| 2003/0211884 | A1 | 11/2003 | Gauselmann | 463/20 |
| 2003/0216166 | A1 | 11/2003 | Baerlocher et al. | 463/20 |
| 2003/0222402 | A1 | 12/2003 | Olive | 273/292 |
| 2003/0224852 | A1 | 12/2003 | Walker | 463/20 |
| 2003/0228899 | A1 | 12/2003 | Evans | 463/25 |
| 2003/0236116 | A1 | 12/2003 | Marks et al. | 463/16 |
| 2004/0009808 | A1 | 1/2004 | Gauselmann | 463/25 |
| 2004/0009811 | A1 | 1/2004 | Torango | 463/25 |
| 2004/0023716 | A1 | 2/2004 | Gauselmann | 463/23 |
| 2004/0038741 | A1 | 2/2004 | Gauselmann | 463/42 |
| 2004/0048644 | A1 | 3/2004 | Gerrard et al. | 463/16 |
| 2004/0063484 | A1 | 4/2004 | Dreaper et al. | 463/16 |
| 2004/0087368 | A1 | 5/2004 | Gauselmann | 463/42 |
| 2004/0092304 | A1 | 5/2004 | George | 463/29 |
| 2004/0102243 | A1 | 5/2004 | Olsen | 463/25 |
| 2004/0106448 | A1 | 6/2004 | Gauselmann | 463/25 |
| 2004/0132524 | A1 | 7/2004 | Ramstad et al. | 463/16 |
| 2004/0152511 | A1 | 8/2004 | Nicely et al. | 463/27 |
| 2004/0204226 | A1 | 10/2004 | Foster et al. | 463/20 |
| 2004/0204235 | A1 | 10/2004 | Walker et al. | 463/29 |
| 2004/0235552 | A1 | 11/2004 | Gauselmann | 463/16 |
| 2004/0242297 | A1 | 12/2004 | Walker et al. | 463/16 |
| 2004/0242303 | A1 | 12/2004 | Walker et al. | 463/16 |
| 2004/0248651 | A1 | 12/2004 | Gagner et al. | 463/42 |
| 2005/0003880 | A1 | 1/2005 | Englman | 463/16 |
| 2005/0003886 | A1 | 1/2005 | Englman et al. | 463/25 |
| 2005/0014554 | A1 | 1/2005 | Walker | 463/20 |
| 2005/0017451 | A1 | 1/2005 | Ollington | 273/292 |
| 2005/0026674 | A1 | 2/2005 | Wolf et al. | 463/19 |
| 2005/0037837 | A1 | 2/2005 | Rowe | 463/25 |
| 2005/0055113 | A1 | 3/2005 | Gauselmann | 700/91 |
| 2005/0059467 | A1 | 3/2005 | Saffari et al. | 463/19 |
| 2005/0059472 | A1 | 3/2005 | Joshi et al. | 463/20 |
| 2005/0064930 | A1 | 3/2005 | Jubinville et al. | 463/17 |
| 2005/0075889 | A1 | 4/2005 | Gomes et al. | 705/1 |
| 2005/0096130 | A1 | 5/2005 | Mullins | 463/27 |
| 2005/0137010 | A1 | 6/2005 | Enzminger et al. | 463/25 |
| 2005/0148382 | A1 | 7/2005 | Fox | 463/19 |
| 2005/0159207 | A1 | 7/2005 | Thomas | 463/20 |
| 2005/0187008 | A1 | 8/2005 | Nakajima | 463/16 |
| 2005/0187014 | A1 | 8/2005 | Saffari et al. | 463/27 |
| 2005/0192073 | A1 | 9/2005 | Nakajima | 463/27 |
| 2005/0192088 | A1 | 9/2005 | Hartman et al. | 463/27 |
| 2005/0215313 | A1 | 9/2005 | O'Halloran | 463/26 |
| 2005/0282628 | A1 | 12/2005 | Beatty | 463/27 |
| 2006/0003829 | A1 | 1/2006 | Thomas | 463/20 |
| 2006/0009280 | A1 | 1/2006 | Joshi et al. | 463/25 |
| 2006/0009283 | A1 | 1/2006 | Englman et al. | 463/29 |
| 2006/0019737 | A1 | 1/2006 | Yang | 463/19 |
| 2006/0019744 | A1 | 1/2006 | Roemer | 463/26 |
| 2006/0025195 | A1 | 2/2006 | Pennington et al. | 463/16 |
| 2006/0025210 | A1 | 2/2006 | Johnson | 463/25 |
| 2006/0030403 | A1 | 2/2006 | Lafky et al. | 463/27 |
| 2006/0035706 | A1 | 2/2006 | Thomas et al. | 463/27 |
| 2006/0040732 | A1 | 2/2006 | Baerlocher et al. | 463/25 |
| 2006/0052159 | A1 | 3/2006 | Cahill et al. | 463/27 |
| 2006/0073877 | A1 | 4/2006 | Rodgers et al. | 463/20 |
| 2006/0073889 | A1 | 4/2006 | Edidin et al. | 463/27 |
| 2006/0116201 | A1 | 6/2006 | Gausselmann | 463/26 |
| 2006/0121971 | A1 | 6/2006 | Slomiany | 463/16 |
| 2006/0135243 | A1 | 6/2006 | Englman et al. | 463/29 |
| 2006/0142079 | A1 | 6/2006 | Ikehara et al. | 463/27 |
| 2006/0142086 | A1 | 6/2006 | Blackburn et al. | 463/42 |
| 2006/0154718 | A1 | 7/2006 | Willyard et al. | 463/25 |
| 2006/0178203 | A1 | 8/2006 | Hughes et al. | 463/20 |
| 2006/0183535 | A1 | 8/2006 | Marks et al. | 463/20 |
| 2006/0183537 | A1 | 8/2006 | Dickerson | 463/27 |
| 2006/0183538 | A1 | 8/2006 | Michaelson et al. | 463/27 |
| 2006/0281527 | A1 | 12/2006 | Dunaevsky et al. | 463/20 |
| 2006/0287077 | A1 | 12/2006 | Grav et al. | 463/27 |
| 2007/0026941 | A1 | 2/2007 | Block et al. | 463/29 |
| 2007/0054733 | A1 | 3/2007 | Baerlocher | 463/27 |
| 2007/0060244 | A1 | 3/2007 | Yaldoo et al. | 463/16 |
| 2007/0060271 | A1 | 3/2007 | Cregan et al. | 463/16 |
| 2007/0060314 | A1 | 3/2007 | Baerlocher et al. | 463/25 |
| 2007/0060319 | A1 | 3/2007 | Block et al. | 463/27 |
| 2007/0060365 | A1 | 3/2007 | Tien et al. | 463/42 |
| 2007/0259711 | A1 | 11/2007 | Thomas | 463/22 |
| 2008/0020847 | A1 | 1/2008 | Kniesteadt et al. | 463/42 |
| 2008/0070702 | A1 | 3/2008 | Kaminkow et al. | 463/46 |
| 2008/0081690 | A1 | 4/2008 | Baerlocher et al. | 463/25 |
| 2008/0113771 | A1 | 5/2008 | Baerlocher et al. | 463/25 |
| 2008/0139290 | A1 | 6/2008 | Kniesteadt et al. | 463/20 |
| 2008/0153564 | A1 | 6/2008 | Baerlocher et al. | 463/16 |
| 2010/0291991 | A1 | 11/2010 | Baerlocher et al. | 463/20 |

FOREIGN PATENT DOCUMENTS

| | | | | |
|---|---|---|---|---|
| DE | 196 24 321 | A1 | 1/1998 | G07F 17/32 |
| EP | 0 521 599 | A1 | 1/1993 | G07F 17/34 |
| GB | 2 153 572 | A | 8/1985 | G07F 17/34 |
| GB | 2 181 589 | A | 4/1987 | G07F 17/34 |
| GB | 2 242 300 | A | 9/1991 | G07F 17/34 |
| GB | 2 313 792 | A | 12/1997 | A63F 5/00 |
| GB | 2 333 880 | | 8/1999 | G07F 17/34 |
| GB | 2 350 715 | A | 12/2000 | G07F 17/32 |
| WO | WO 99/03078 | A1 | 1/1999 | G07F 17/34 |
| WO | WO 99/15246 | | 4/1999 | A63F 3/06 |
| WO | WO 99/19037 | A1 | 4/1999 | A63F 9/22 |
| WO | WO 0133478 | A1 | 5/2001 | G07F 17/34 |
| WO | WO 03/026754 | A1 | 4/2003 | A63F 5/00 |
| WO | WO 03/083789 | A1 | 10/2003 | |
| WO | WO 2005/113088 | A1 | 12/2005 | A63F 13/00 |
| WO | WO 2006/014770 | A2 | 2/2006 | A63F 9/24 |
| WO | WO 2006/014990 | A2 | 2/2006 | A63F 9/24 |
| WO | WO 2006/039349 | A2 | 4/2006 | A63F 9/24 |
| WO | WO 2007/117502 | A2 | 10/2007 | A63F 9/24 |

OTHER PUBLICATIONS

PCT International Search Report for International Application No. PCT/US2005/015687 dated Oct. 28, 2005 (2 pages).

PCT International Search Report for International Application No. PCT/US2006/016536 dated Oct. 5, 2006 (3 pages).

International Search Report—PCT/US06/20979 dated Nov. 13, 2006 (2 pages).

PCT International Search Report for International Application No. PCT/US2006/34407 dated Sep. 28, 2007 (2 pages).

* cited by examiner

GAMING MACHINE HAVING A COMMUNITY GAME WITH SIDE WAGERING

CROSS REFERENCE TO RELATED APPLICATIONS

This application is a continuation of U.S. application Ser. No. 11/223,296, filed Sep. 9, 2005, now allowed, which is a continuation-in-part of U.S. application Ser. No. 10/612,478, filed Jul. 2, 2003, now issued as U.S. Pat. No. 7,662,040, and which is a continuation-in-part of International Application No. PCT/US2005/015687, filed May 5, 2005, which claims the benefit of U.S. Provisional Application No. 60/570,583, filed May 13, 2004, each of which is incorporated herein by reference in its entirety.

FIELD OF THE INVENTION

The present invention relates generally to gaming machines and, more particularly, to a gaming machine and a gaming system having a community event provided with a plurality of communal features.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "secondary" or "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves the collecting of coin-in data from participating gaming device(s) (e.g., slot machines), contributing a percentage of that coin-in data to a jackpot amount, and awarding that jackpot amount to a player upon the occurrence of a certain jackpot-won event. A jackpot-won event typically occurs when a "progressive winning position" is achieved at a participating gaming device. If the gaming device is a slot machine, a progressive winning position may, for example, correspond to alignment of progressive jackpot reel symbols along a certain pay line. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement. In existing progressive games, once a player at a first gaming machine enters the progressive game, the players at the other gaming machines are not involved in the progressive game. In other words, the other players do not get the opportunity to participate in the progressive game.

While these player appeal features provide some enhanced excitement relative to other known games, there is a continuing need to develop new features for gaming machines to satisfy the demands of players and operators. Specifically, the current progressive games only provide enhanced excitement to the player invited to play for the jackpot. Thus, there is a need for engaging multiple players after one player enters a communal game.

SUMMARY OF THE INVENTION

In accordance with one aspect of the present invention, a method for conducting a communal wagering game on a plurality of gaming machines each having a video display is disclosed. The method comprises determining, for each of the plurality of gaming machines, a value-enhancement parameter to apply to the communal wagering game. The value-enhancement parameter is a first value-enhancement parameter for a first gaming machine and a second value-enhancement parameter for a second gaming machine. The method further comprises displaying on at least one community display a plurality of elements. One or more of the plurality of elements have a communal value associated therewith. The method further comprises displaying on the respective video display of the first gaming machine and the second gaming machine at least some of the plurality of elements having a player value associated therewith. The first player value on the first gaming machine being the communal value enhanced by the first value-enhancement parameter. The second player value on the second gaming machine being the communal value enhanced by the second value-enhancement parameter.

According to another aspect of the present invention, a method for conducting a communal wagering game on a plurality of gaming machines each having a video display is disclosed. The method comprises determining, for each of the selected plurality of gaming machines, a value-enhancement parameter to apply to the communal wagering game. The method further comprises displaying on at least one community display a trail formed by a plurality of stations. One or more of the plurality of stations have a communal value associated therewith. The method further comprises displaying on the video display of each of the selected plurality of gaming machines the trail formed by the plurality of stations. One or more of the plurality of stations having a player value associated therewith. The value-enhancement parameter being applied to the communal value to determine the player value for the one or more plurality of stations at each of the selected plurality of gaming machines.

In accordance with another aspect of the present invention, a method for conducting a communal wagering game on a plurality of gaming machines is disclosed. The method comprises determining, for at least one of the gaming machines, a value-enhancement parameter to apply to the communal wagering game. The method further comprises displaying, on a community display, an element and a communal value associated therewith. The method further comprises displaying, on a display of the at least one of the gaming machines, the element and a player value associated therewith. The player value is the communal value enhanced by the value-enhancement parameter.

According to still another aspect of the present invention, a computer readable medium is disclosed that is encoded with instructions for directing a gaming system to perform the above-described methods.

According to yet another aspect of the present invention, a gaming system for playing a wagering game is disclosed. The gaming system comprises at least one community display, a first gaming machine, and a second gaming machine. The at least one community display displays a communal game that includes a plurality of elements. At least some of the plurality of elements have a communal value associated therewith. The first gaming machine has a first video display for displaying the plurality of elements. At least some of the plurality of elements have a first player value associated therewith. The first gaming machine determines the first player values by applying a first value-enhancement parameter to the communal values associated with at least some of the plurality of elements. The second gaming machine has a second video display for displaying the plurality of elements. At least some of the plurality of elements have a second player value associated therewith. The second gaming machine determines the second player values by applying a second value-enhancement parameter to the communal values associated with at least some of the plurality of elements. The first value-enhancement parameter is different than the second value-enhancement parameter.

In accordance with one aspect of the present invention, there is provided a gaming system having a plurality of interconnected gaming terminals. Each of the gaming terminals are capable of conducting wagering games. When one of the gaming machines achieves a special gaming session, for example, a progressive game, the other gaming terminals receive a side wager inquiry signal. A side wager inquiry is then displayed to players of the other gaming terminals. Thus, players who have not won a chance to play for a jackpot are permitted to wager on events within the progressive game played by another player.

In accordance with another aspect of the present invention, there is provided a gaming system including a plurality of gaming terminals that conduct wagering games. Located above and coupled to the plurality of gaming terminals is signage. The signage conducts a progressive wagering game for players at the gaming terminals. A local controller is included in the signage and randomly selects a progressive game outcome. The progressive game outcome is displayed on the signage.

The above summary of the present invention is not intended to represent each embodiment, or every aspect, of the present invention. This is the purpose of the figures and the detailed description which follow.

BRIEF DESCRIPTION OF THE DRAWINGS

The foregoing and other advantages of the invention will become apparent upon reading the following detailed description and upon reference to the drawings.

Figure 1:
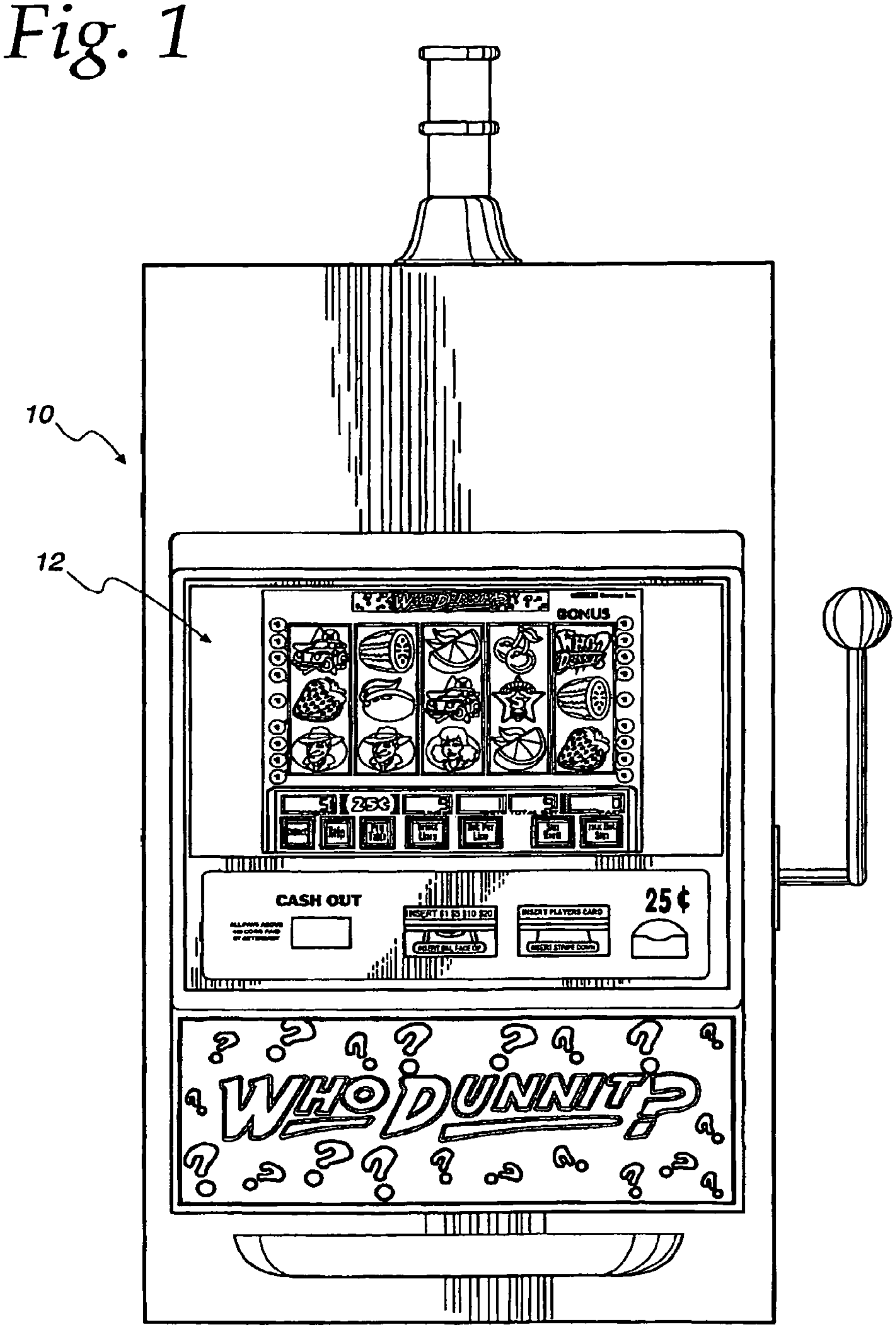
FIG. 1 is a perspective view of a video gaming machine according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, a video gaming machine 10 is depicted that may be used to implement the enhanced progressive game according to the present invention. The gaming machine 10 includes a video display 12 that may comprise a CRT, LCD, plasma, LED, electro-luminescent display, or generally any type of video display known in the art. In the illustrated embodiment, the gaming machine 10 is an “upright” version in which the video display 12 includes a touch screen and is oriented vertically relative to the player. It will be appreciated, however, that any of several other models of gaming machines are within the scope of the present invention, including, for example, a "slant-top" version in which the video display is slanted at about a 30° angle toward the player, or gaming machines that include mechanical, rather than video, displays.

In one embodiment, the gaming machine 10 is operable to play a game entitled WHO DUNNIT?™ having a mystery theme. The WHO DUNNIT?™ game features a basic game in the form of a slot machine with five simulated spinning reels and a bonus game with selection options directing game activities on the video display 12. Such a gaming machine is disclosed in detail in U.S. Publication No. US 2002/0090990 A1, which is incorporated herein by reference in its entirety. It will be appreciated, however, that the gaming machine 10 may be implemented with games other than the WHO DUNNIT?™ game and/or with several alternative game themes.

Figure 2:
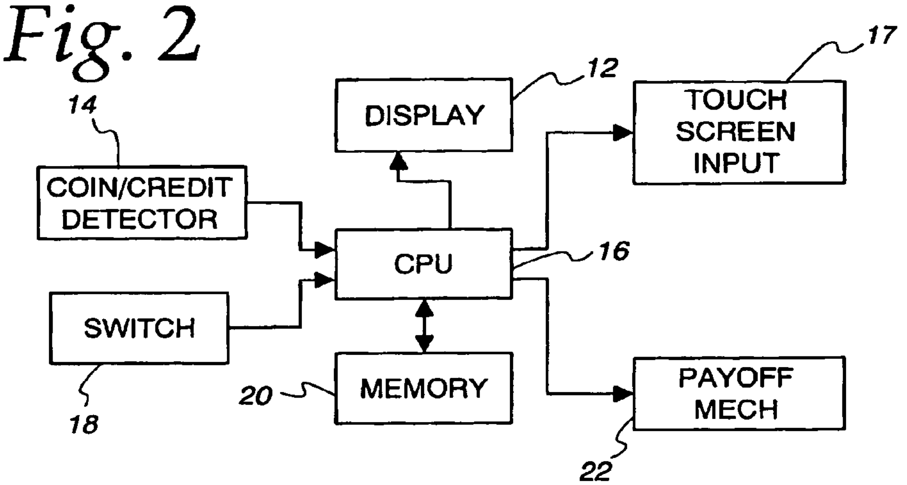
FIG. 2 is a block diagram of the gaming machine of FIG. 1.

FIG. 2 is a block diagram of a control system suitable for operating the gaming machine 10. Coin/credit detector 14 signals a CPU 16 when a player has inserted a number of coins or played a number of credits. Then, the CPU 16 executes a game program which causes the video display 12 to display the basic game that includes simulated reels with symbols displayed thereon. The player may select the number of paylines to play and the amount to wager via touch screen input keys 17. The basic game commences in response to the player activating a switch 18 in a lever or push button, causing the CPU 16 to set the reels in motion, randomly select a game outcome, and then stop the reels to display symbols corresponding to the pre-selected game outcome. Preferably, certain basic game outcomes cause the CPU 16 to enter a bonus mode, which causes the video display 12 to show a bonus game, as is known in the art.

A system memory 20 stores control software, operational instructions, and data associated with the gaming machine 10. In one embodiment, the system memory 20 comprises a separate read-only memory (ROM) and battery-backed random-access memory (RAM). It will be appreciated, however, that the system memory 20 may be implemented on any of several alternative types of memory structures or may be implemented on a single memory structure. To provide gaming functions, the CPU 16 executes one or more game programs stored in a computer readable storage medium, in the form of the system memory 20. A payoff mechanism 22 is operable in response to instructions from the CPU 16 to award a payoff of coins or credits to the player in response to certain winning outcomes which may occur in the basic game or bonus game. The payoff amounts corresponding to certain combinations of symbols in the basic game are predetermined according to a pay table stored in system memory 20. The payoff amounts corresponding to certain outcomes of the bonus game are also stored in system memory 20.

The gaming machine 10 of FIGS. 1 and 2 is a gaming terminal that receives inputs, randomly selects outputs and displays outputs, as controlled by the internal CPU 16. It will be appreciated, however, that the present invention can be used by gaming terminals controlled by external CPUs.

While the gaming machine 10 of FIGS. 1 and 2 has been described with respect to providing a player a basic game and a bonus game, the gaming machine 10 can be connected to a progressive game to which several gaming machines are linked. This gaming network and, in particular, the novel side wagering feature that can be activated by the player of the gaming machine 10 will be described below with reference to FIGS. 3-7.

Figure 3:
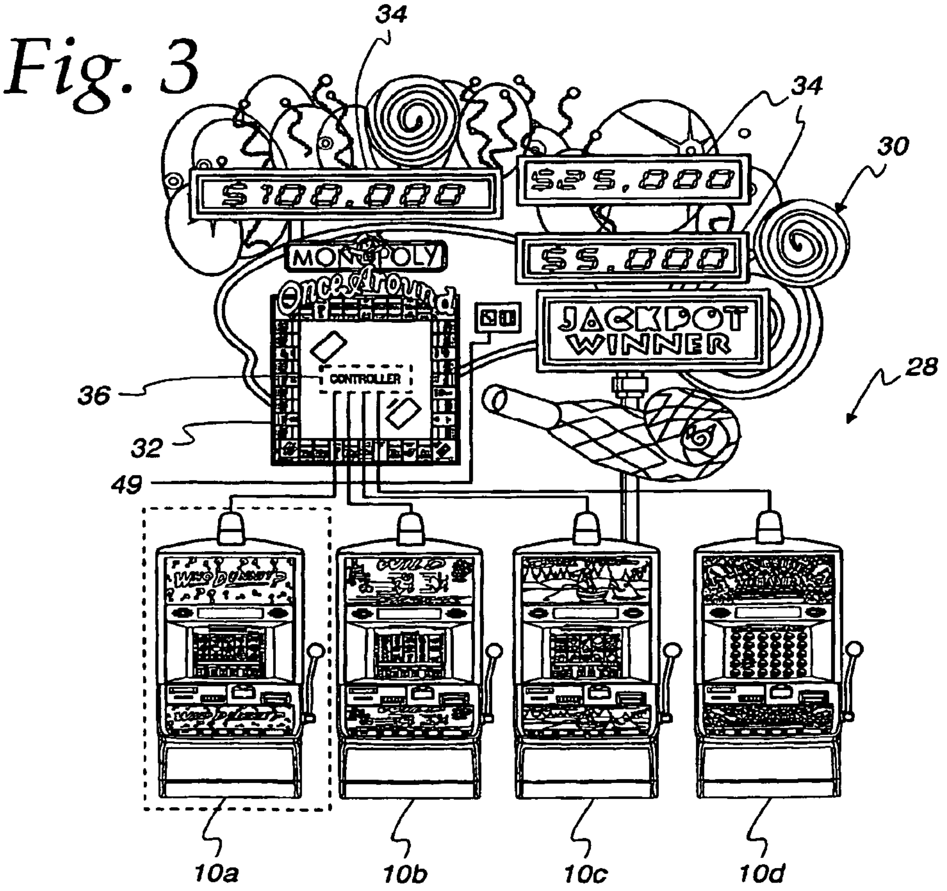
FIG. 3 is a gaming system of interconnected video gaming machines and signage according to one embodiment of the present invention, one gaming machine achieving a progressive game and the other three gaming machines being able to make a side wager on the progressive game.

Referring now to FIG. 3, a gaming system 28 of gaming machines 10*a*, 10*b*, 10*c*, 10*d* is shown. The four gaming machines 10*a*, 10*b*, 10*c*, 10*d* are of the type described above in relation to FIGS. 1 and 2. The four gaming machines 10*a*, 10*b*, 10*c*, 10*d* are interconnected and included under signage 30. The signage 30 includes a game screen 32 for displaying the progressive game which, in this embodiment, is the MONOPOLY ONCE AROUND™ game, and at least one jackpot screen 34 displaying a plurality of dollar amounts for a multi-level progressive game. In this embodiment, there are three dollar amount levels: a Mini Jackpot, a Maxi Jackpot, and a Mega Jackpot. In other embodiments, there may be any number of progressive jackpots.

The signage 30 includes a signage controller 36 that is connected to each of the four gaming machines 10*a*, 10*b*, 10*c*, 10*d*. The signage controller 36 transmits information to and receives information from the CPU 16 (FIG. 2) in each of the four gaming machines 10*a*, 10*b*, 10*c*, 10*d* throughout the game. The gaming system 28 allows for various aspects of the gaming machines 10*a*, 10*b*, 10*c*, 10*d*, such as playing progressive games to be controlled through the signage controller 36 in the signage 30. Thus, all of the gaming machines 10*a*, 10*b*, 10*c*, 10*d* are linked to the progressive game.

Figure 4:
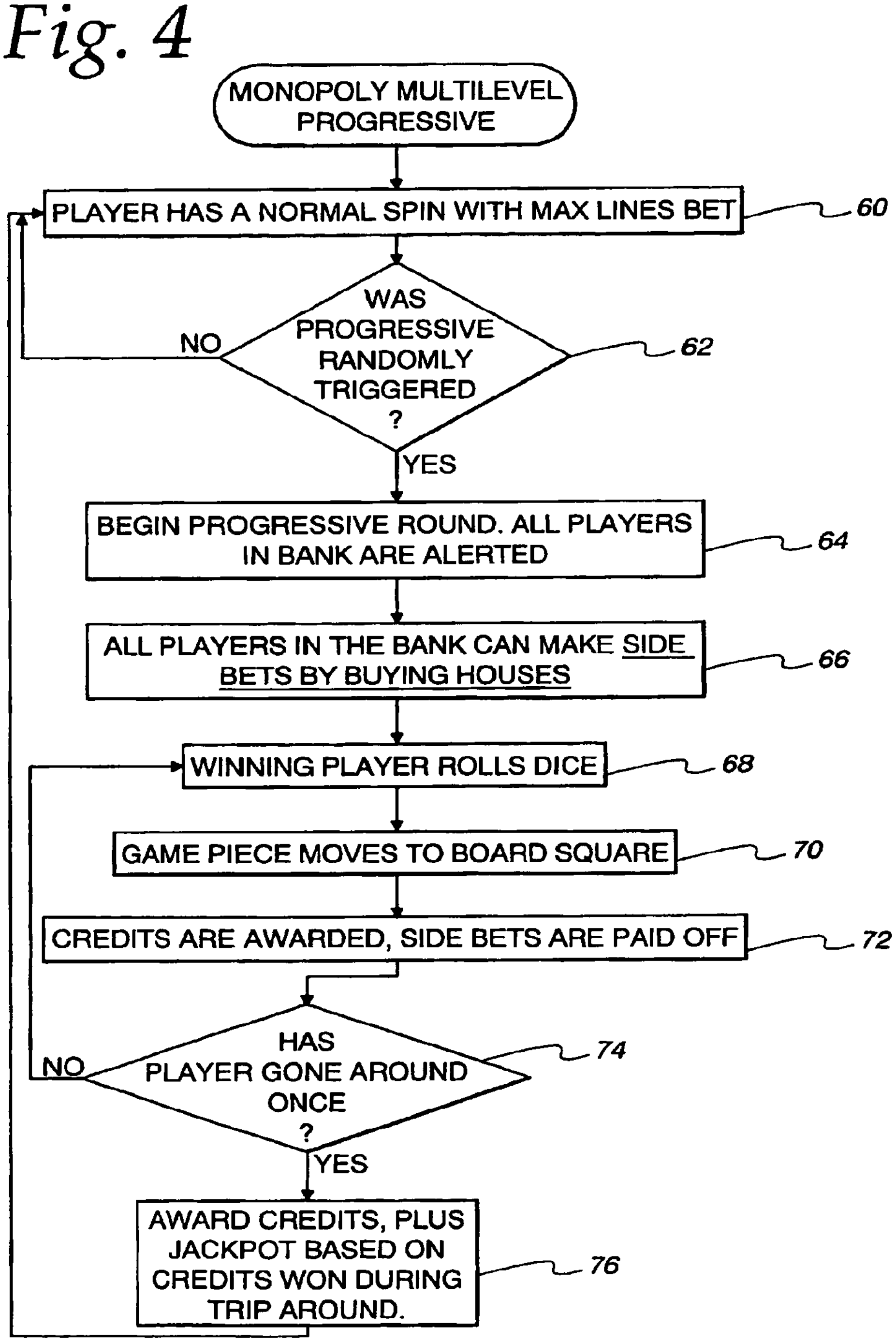
FIG. 4 is a flowchart describing the operation of the gaming machines and the signage of FIG. 3.

Turning now to FIG. 4, the operation of the progressive game of the gaming system 28 will be described. Reference to FIGS. 5-8 will be made to best describe this operation. In step 60, a player at the gaming machine 10 begins a game by any conventional method (e.g., inserting coins or using credits). Each gaming machine 10*a*, 10*b*, 10*c*, 10*d* has a basic game that involves a player choosing a number of paylines to play and choosing a wager to place on each payline. In some embodiments, there are a maximum of nine paylines. After choosing how many paylines to play, the player selects how many credits (e.g., 1-5) to wager on each payline. Any player who plays the maximum number of paylines—in the case of the WHO DUNNIT™ gaming machine 10, nine paylines—is eligible to be invited to play in the progressive game. At step 62, it is determined if the progressive game has been randomly triggered by the CPU 16 of the gaming machine 10. This happens when a start progressive outcome, e.g, a combination of jackpot signals, occurs on the screen. If the progressive outcome is not reached, then the gaming machine 10 continues to operate normally. Thus, the player continues to choose the wager amount for each line, spins the reels, and any pay out or bonus games are played normally. Once the game ends, the player is either paid out or more coins/credits are requested for another game.

Figure 5:
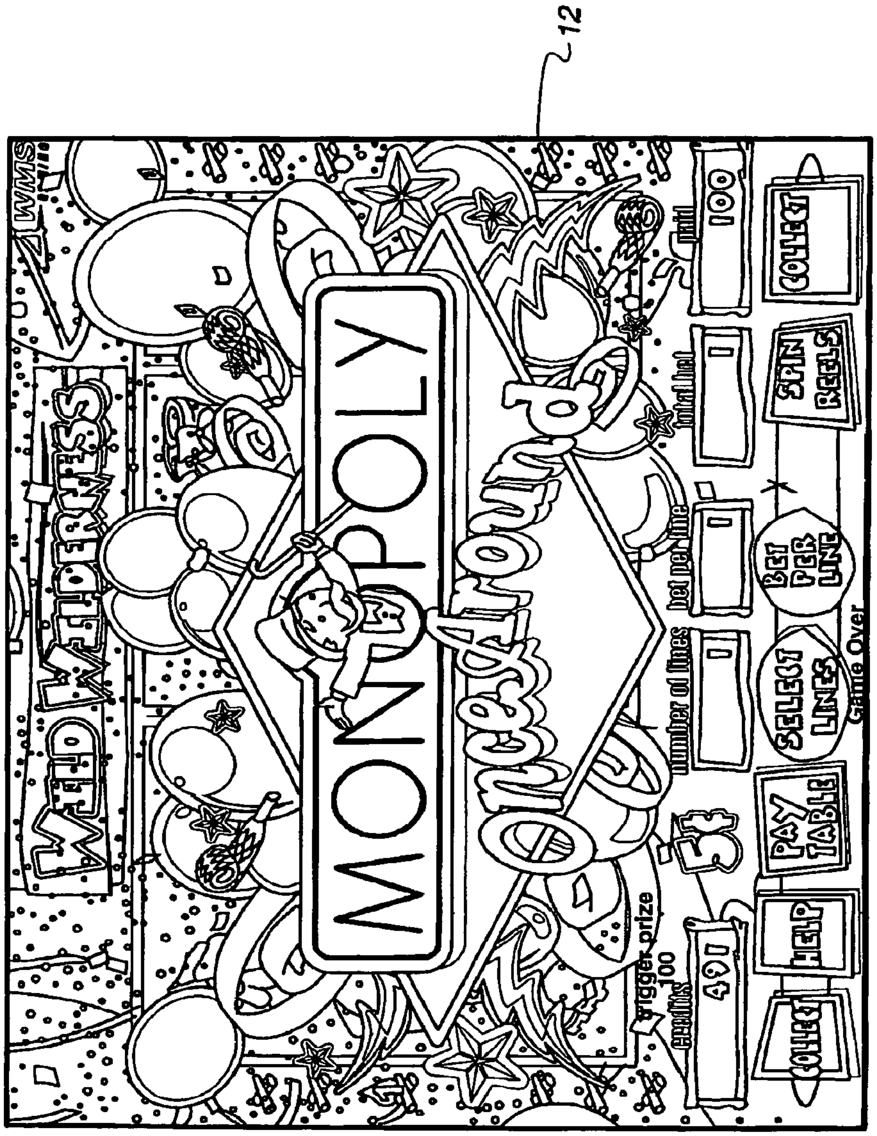
FIG. 5 is an illustration of a progressive game screen which may be implemented on the gaming machine achieving the progressive game at step 62 of FIG. 4.

If, at step 62, one of the gaming machines 10*a*—which will be referred to as the progressive play gaming machine 10*a*—has been selected for the progressive game, the basic game initially continues as normal, with the player playing the basic game and any bonus games. The CPU 16 of the progressive play gaming machine 10*a* sends a signal to the signage controller 36 that the progressive game has been activated. After the basic game and bonus game have finished, at step 64, the player is notified that the progressive game has been triggered (as shown in FIG. 5).

In this embodiment, the progressive game is the MONOPOLY ONCE AROUND™ game, which has a board game (e.g., MONOPOLY) theme and is implemented on the game screen 32 and video display 12 of all of the gaming machines 10*a*, 10*b*, 10*c*, 10*d*. The board game defines a plurality of stations or squares about a game board traversable by a game token, or token "identifier" indicating the position of a token, or player. For example, in one embodiment, a token "identifier" comprises an illuminated station of the game screen 32 indicating the position of a token. Hereinafter, references to displaying the position of a token, or player, shall be understood to mean the display of either an actual game token or a token identifier on a game board or portion thereof.

Figure 7:
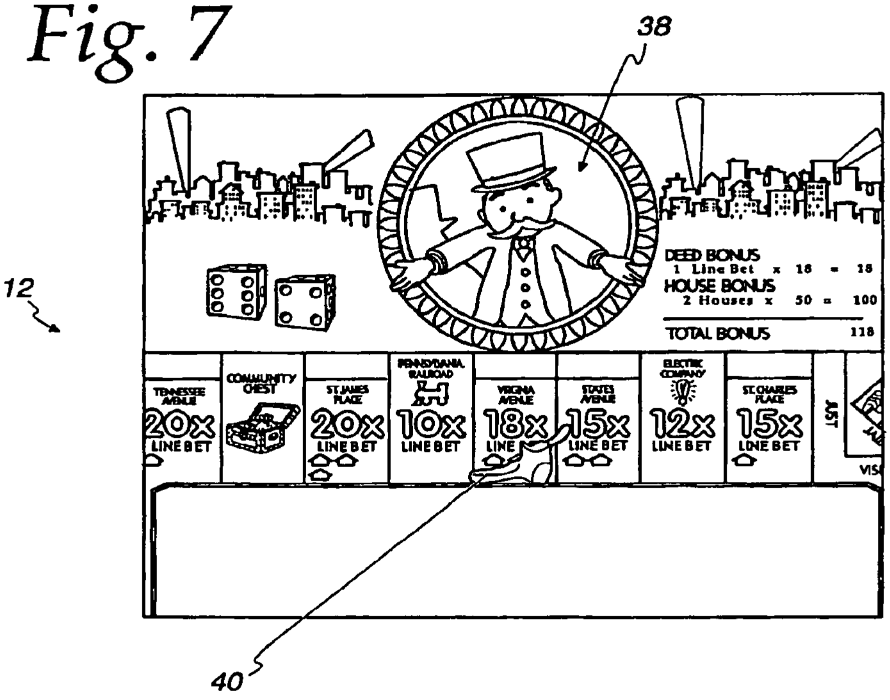
FIG. 7 is an illustration of a progressive game play screen which may appear on the video display of the gaming machines able to make a side wager at step 70 of FIG. 4.
Figure 8:
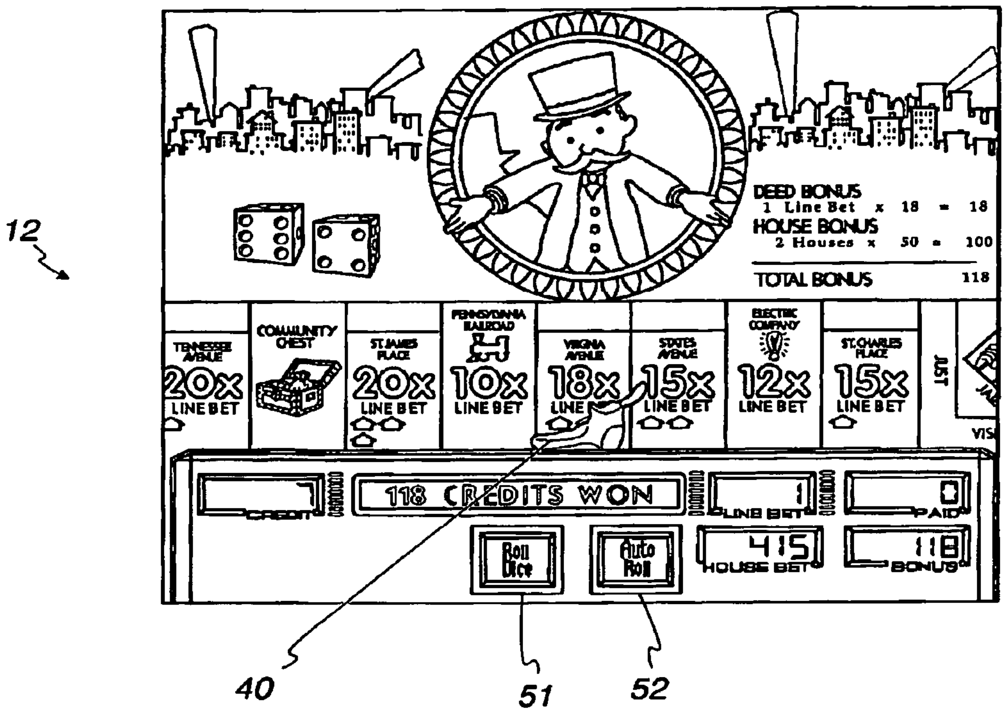
FIG. 8 is an illustration of a progressive game play screen which may appear on the video display of the gaming machine achieving the progressive game and the signage of FIG. 3 at step 70 of FIG. 4.

When the player enters the progressive game at step 64, the video display 12 of the progressive play gaming machine 10*a* instructs the player to select a token 40 (shown as a "SHOE" in FIGS. 7 and 8). In the MONOPOLY ONCE AROUND™ game, a screen may be displayed that shows an animated Rich Uncle Pennybags symbol above a selection of MONOPOLY tokens 40 (e.g., "CAR," "DOG," "HORSE," "SHOE" and "HAT"), and the player is prompted to select one of the game tokens 40. Such a method and others are disclosed in U.S. Pat. No. 6,315,660, which is incorporated herein by reference in its entirety.

Also at step 64, the signage controller 36 sends a side wager inquiry signal that notifies the players at other gaming machines 10*b*, 10*c*, 10*d* in the system 28—hereinafter referred to as the side wager gaming machines 10*b*, 10*c*, 10*d*—that someone is entering the progressive game.

Then, at step 66, a screen is displayed on the video display 12 of the side wager gaming machines 10*b*, 10*c*, 10*d*, giving the other players the opportunity to make side wagers on the stations of the game board which the player predicts will be landed on during the progressive game. The side wagerers are given a particular amount of time (e.g., 30 seconds) to make any side wagers. The time to make a side wager may be counted down by a clock on the display 12 of the side wager gaming machines 10*b*, 10*c*, 10*d*. The increments of the side wagers which may be made on the various stations may be varied according to the game program. For example, in the MONOPOLY ONCE AROUND progressive game, the player has the opportunity to "build" houses (make side wagers) on the properties of the MONOPOLY board which the player predicts will be landed on during the progressive game. The amount of the side wager corresponds to the "cost" of the houses built on the various properties, which generally varies according to the property selected.

Figure 6:
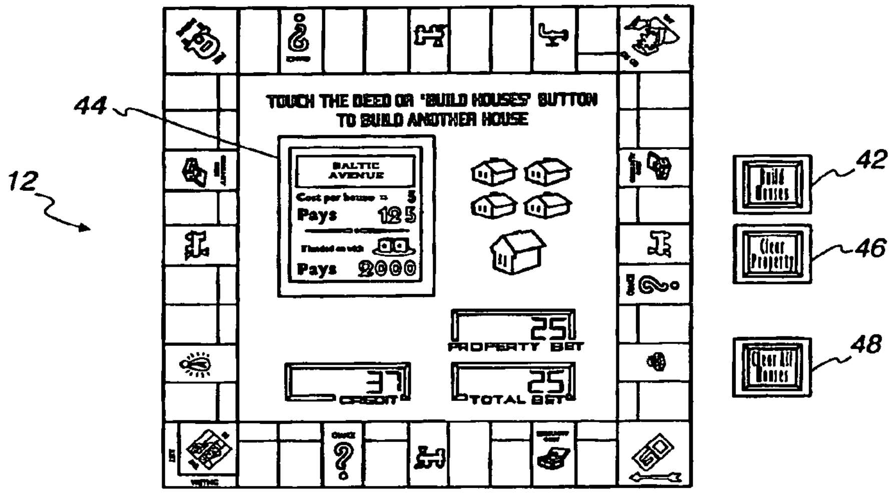
FIG. 6 is an illustration of a “Build Houses” screen which appears on the video display of the gaming machines able to make a side wager at step 66 in FIG. 4.

While still at step 66, and after the selection of a property, the signage controller 36 operates to display a property deed 44 (FIG. 6) corresponding to the selected property on the video display 12 of whichever side wager gaming machine 10*b*, 10*c*, 10*d* that is making the wager. In FIG. 6, the property deed shown on the video display 12 of the side wager gaming machines 10*b*, 10*c*, 10*d* is "Baltic Avenue," thus indicating that the player has elected to build houses on Baltic Avenue. More specifically, the player has identified the "Baltic Avenue" station as a predicted landing position of the token 40. The player builds houses on the selected property by any number of methods, including touching the deed 44 or touching a specific key 42. The cost of the houses may vary depending on the property, such as disclosed in U.S. Pat. No. 6,315,660, which was incorporated by reference above.

While still at step 66, the cost of the houses is subtracted from the credits previously earned or paid into the side wager gaming machine 10*b*, 10*c*, 10*d* by the player. In one embodiment, the player may insert coins or bills into the side wager gaming machine 10*b*, 10*c*, 10*d* at any time during display of the screen shown in FIG. 6 to increase the credits available for building houses. Various keys 46, 48 are provided to allow the players to clear their side wagers should they desire to do so before the beginning of the progressive game. Once the side wagers are made, a side wager response signal is transmitted from the side wager gaming machine 10*b*, 10*c*, 10*d* to the signage controller 36 indicating that the side wager has been made.

Also occurring at step 66, the video display 12 displays a number of house and hotel icons corresponding to the number of houses built on each selected property. In FIG. 6, for example, the video display 12 shows four green house icons and a red hotel icon represents the fifth wager placed on Baltic Avenue. The displayed property deed 44 identifies the cost per house (e.g., credits for Baltic Avenue) and the pay value of landing on the property (e.g., 125 credits for Baltic Avenue, with five houses).

At step 68, once the player of the progressive play gaming machine 10*a* (FIG. 3) selects a token 40 and all side wagers have been placed, the signage controller 36 displays a portion of the game board on the video display 12 of all of the gaming machines 10*a*, 10*b*, 10*c*, 10*d* with the selected token 40 on a starting station of the game board. The signage controller 36 also illuminates the starting station on the game screen 32. For example, in the MONOPOLY ONCE AROUND™ game, the starting station is the "GO" square. The signage controller 36 then randomly selects an integer movement value defining a number of stations or steps which the token 40 is to be moved from the GO square.

In one embodiment, the player "rolls" a pair of dice 49 (FIG. 3) by touching a "Roll Dice" key 50 or "Auto Roll" key 52 on the video display 12 of the progressive play gaming machine 10*a*. At step 70, token 40 (FIGS. 7 and 8) is advanced across the game board according to the roll of the dice. On the game screen 32 (FIG. 3), movement is illustrated by the illumination, in step-wise fashion, of the appropriate stations (squares) on the game board (e.g., MONOPOLY board) from the previous position to the position determined by the roll of dice. On the video display 12 of the gaming machines 10*a*, 10*b*, 10*c*, 10*d*, movement is illustrated by the selected game token (e.g., "SHOE") moving, one space at a time, a corresponding number of spaces on a scrolling portion of the game board. The landing of the token 40 on a particular square or station of the game board constitutes an event in the progressive game.

At step 72, after each roll, the player of the progressive game machine 10*a* is awarded a point amount that corresponds to the square. In the MONOPOLY ONCE AROUND™ game, if the token 40 lands on a "Chance" or "Community Chest" station (square) during the progressive game, the player playing the progressive game receives an award of a fixed number of points (e.g., "BANK ERROR IN YOUR FAVOR, 100 points), or they can move the player to a new space (e.g., GO BACK THREE SPACES). If the token 40 lands on a property, various points are awarded to the player. In some embodiments, the points awarded may be dependent on the value of the property, as described in U.S. Pat. No. 6,315,660.

Then, at step 72, the signage controller 36 compares the event to the position(s) wagered on by the side wager gaming machines 10*b*, 10*c*, 10*d* and, if the event matches any of the position(s) wagered on, the player who made the side wager is paid an amount of coins or credits, as appropriate, corresponding to the cost of building the house(s) on that property.

Next, at step 74, the signage controller 36 determines if the player has moved once around the entire board. If the answer is "no," the program returns to step 68 and the dice is rolled, creating a new event. If the answer is "yes," then the progressive game has ended and the program moves to step 76 and awards credits to the player of the progressive game.

In a preferred embodiment, at step 76, the payout amount that the progressive game player wins is dependent upon the amount of points that were earned. In some embodiments, the progressive game may comprise multiple jackpots of varying amounts. The more points that the player accumulates during the game, the more credits or money that is paid to the player at the end. As shown in FIG. 3, the gaming system 28 has three payouts, or levels: a mini progressive, a maxi progressive, and a mega progressive. The mini progressive pays out when a player earns between 0 and 499 points during the progressive game, the maxi progressive pays out to players who have earned between 500 and 999 points, and the mega progressive only pays out to players who earn more than 1000 points during the progressive game.

Once one of the levels of a progressive game has been paid out, that level resets itself to the base amount. The other progressives that did not pay out keep increasing until someone wins that progressive jackpot. The progressive jackpots are created by a base amount being put into the pot (e.g., $1,000 for the mini, $3,000 for the maxi, and $5,000 for the mega). Then, every time one of the gaming machines 10*a*, 10*b*, 10*c*, 10*d* in the system 28 is played, a percentage of the amount wagered is placed into each of the progressives. In some embodiments, 1% may go to the mini progressive, ½% to the maxi progressive, and ¼% to the mega progressive. Because the maxi progressive and the mega progressive payouts less often than the mini progressive, less money needs to go to fund these progressives.

After the credits are all awarded and the progressive has been reset, the program goes back to step 60, with a player playing the maximum number of paylines on the machine.

In another embodiment, the present invention may operate to allow other players to make side wagers when one player has reached any, special gaming session. The special gaming session is any game other than the basic game depicted in FIG. 1. For example, the special gaming session may be a bonus game or a progressive game.

In some embodiments, only the side wager gaming machine 10*b*, 10*c*, 10*d* displays the wager made. A screen displaying the game board may appear on the machine with houses placed on the property on which the player wagered. In other embodiments, the side wagers may be displayed on the game screen 32, with different color houses representing the different players. In either embodiment, multiple players can place side wagers on the same property. For example, two different players can each place five houses on Baltic Avenue.

In an alternative embodiment, the person playing the progressive game can also make side wagers on the various events of the game. The progressive play gaming machine 10*a* would then perform all of the functions described above with respect to the side wager gaming machines 10*b*, 10*c*, 10*d*. The display 12 in FIG. 8 would then also depict the side wagers placed by the person playing the progressive gaming machine 10*a*.

In some embodiments, the amount of points awarded for the "Chance" or "Community Chest" cards is dependent on the amount wagered by the player per each payline in the basic game. A player who wagered the minimum amount per each payline will receive fewer points than a player who wagers the maximum amount per each payline, even if they draw the same card. For example, the card "Grand Opera Opening" has a payout of 9 credits. In this embodiment, that may be the payout for someone who wagered 1 out of a possible 5 credits. For someone who wagered 5 credits, the payout may be 45 credits. Also, the card marked "Go Back Three Spaces" may have multiple space numbers depending on the amount wagered. For example, if only 1 credit is wagered, the card may read "Go Back Two Spaces," but if the player wagered the maximum amount, the card may read "Go Back Five Spaces," thus giving that player more chances to land on property and earn more points.

In another alternative embodiment, the side wager gaming machines 10*b*, 10*c*, 10*d* are offered the chance to place a wager on what the outcome of the progressive game will be. In other words, the side wager gaming machines 10*b*, 10*c*, 10*d* can send a side wager response signal placing a wager on whether the player of the progressive play gaming machine 10*a* will win the mini jackpot, the maxi jackpot, or the mega jackpot. The side wager gaming machines 10*b*, 10*c*, 10*d* will be credited as described above if the predicted outcome matches the outcome of the progressive game.

In another alternative embodiment, at step 62 in FIG. 4, it is the signage controller 36, not the CPU 16, that randomly starts the progressive game. In this embodiment, the signage controller 36 sends a signal to the CPU 16 of the next gaming machine 10 that places a wager that the progressive game has been triggered. The rest of the game proceeds as described above.

Figure 9:
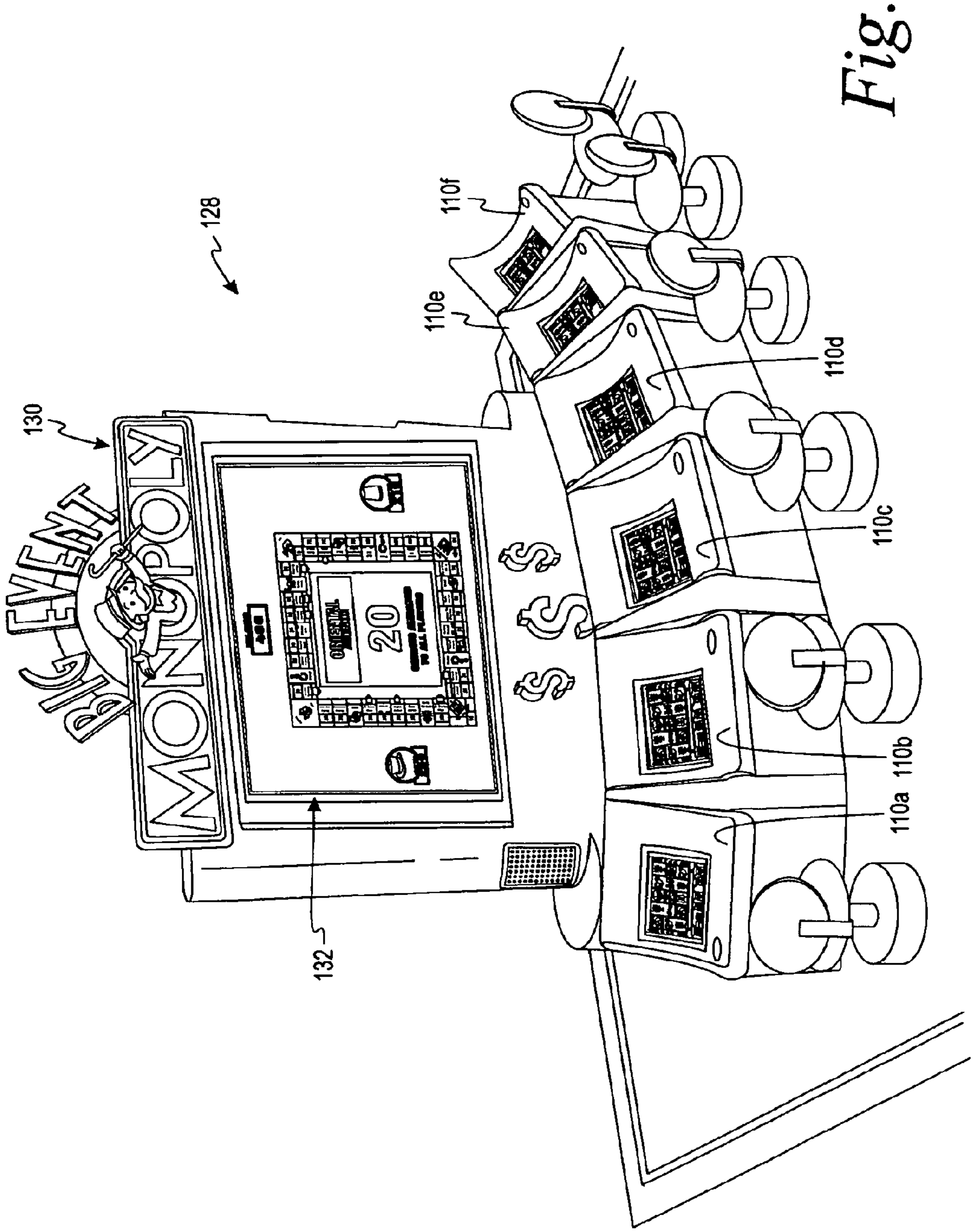
FIG. 9 is an illustration of a gaming system of interconnected gaming machines and signage, according to one embodiment.

Referring now to FIG. 9, a gaming system 128 comprising a bank of gaming machines 110*a-f* is illustrated in accord with one embodiment of the present invention. The gaming machines 110*a-f* may be of the type described above with respect to FIGS. 1-2 or any other type of gaming machine suitable for operating a wagering game. The gaming machines 110*a-f* are interconnected and included under signage 130. The signage 130 includes a community display 132 for displaying a community event thereon. According to one embodiment, the community display 132 is one or more plasma displays visible to each player seated at the bank of gaming machines 110*a-f*.

The signage 130 includes a signage controller (not shown) similar in operation to the signage controller 36 described above with respect to FIG. 3. The signage controller is connected to one or more of the gaming machines 10*a-f* and transmits information to and receives information from the CPU (FIG. 2) in one or more of the gaming machines 110*a-f* throughout the wagering game. The gaming system 128 allows for various aspects of the gaming machines 110*a-f*, such as playing communal games, to be controlled through the signage controller in the signage 130.

According to one embodiment, a community event includes a plurality of elements displayed on the community display 132. One or more of the plurality of elements has a communal value associated therewith. The communal value represents the base award provided to a player participating in the community event when a particular element is earned. As will be discussed below with respect to FIGS. 11*a-c*, the communal value may be increased for each player participating in the community event based on the value-enhancement parameter that has been earned by the individual player. The community event may be, for example, a MONOPOLY ONCE AROUND™ game, a different MONOPOLY® game, or any other type of communal game.

The community event may be initiated by achieving a winning combination of symbols on any of the gaming machines 110*a-f* within the bank or by the signage controller independent of the symbols appearing on the gaming machines 110*a-f*. Once a community event has been initiated, a plurality of players at the bank of gaming machines 110*a-f* are selected to participate in a communal wagering game. According to one embodiment, the players are selected based on their time eligibility as determined by their recent wager history.

Time eligibility is measured using, for example, a time slice, which is the amount of time that a wagered amount gives eligibility to the player for entry into the communal wagering game. A time-slice counter is used to increment and/or decrement time slices for increasing and/or decreasing the time that the player is eligible to participate in the communal wagering game. If the player has eligibility during an increment of time when the community event is triggered, then the player is allowed to play the communal wagering game. The player may also be provided with a value-enhancement parameter within the communal wagering game based on the player's betting history, as will be discussed below with respect to FIGS. 11*a-c*. The value-enhancement parameter may include a plurality of levels that can be earned by the player by wagering on the basic wagering game. Each level has a certain maximum number of purchasable time slices.

FIGS. 10-13*b* illustrate various aspects of a communal bonus game operable on the above-described gaming system 128. In the illustrated embodiments, a MONOPOLY ONCE AROUND™ game is used as an example of one type of communal game that may incorporate the various aspects of the present invention. However, it should be noted that other game types, styles, and features may be utilized in accordance with the present invention.

Figure 10:
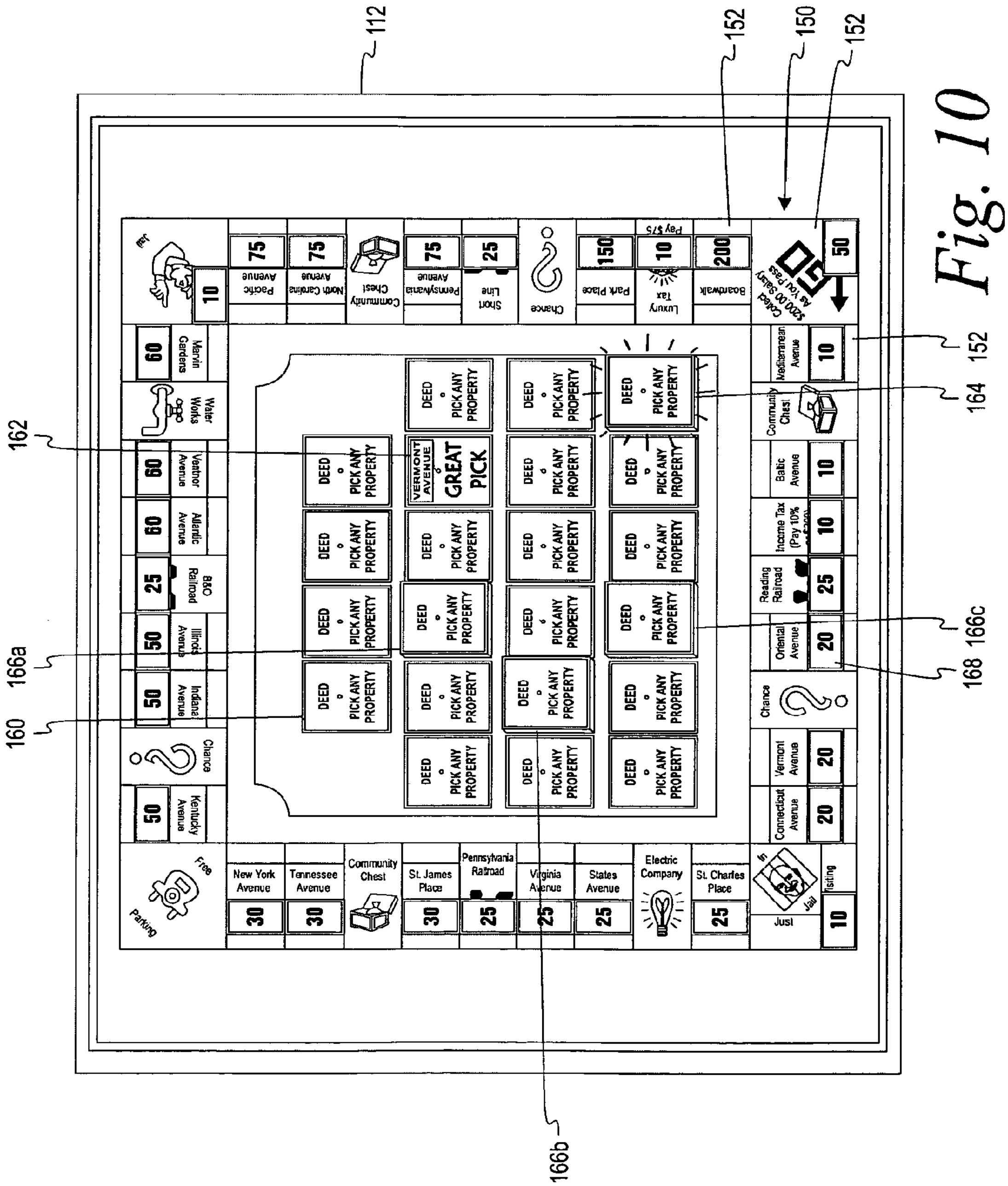
FIG. 10 is an illustration of a deed selection screen, according to one embodiment of the present invention.

Referring now to FIG. 10, a plurality of elements (e.g., a plurality of stations 152) are displayed on the video display 112. In the illustrated embodiment, the stations 152 are aligned to form a trail 150. Once a plurality of players have been selected to participate in the communal wagering game, each player is provided an opportunity to select a plurality of deeds 160 (e.g., up to 5) that represent individual stations 152 along the trail 150. As illustrated in FIG. 10, the player has selected a first deed 162 that represents "VERMONT AVENUE."

The various deeds 160 are arranged so as to allow the player to select the deeds 160 by utilizing the touch screen input keys 17 (FIG. 2) or other input means. In some embodiments, the player is given a predetermined length of time to select the required number of deeds 160. If the player fails to select the required amount of deeds 160 in the allotted period of time, the gaming system 128 automatically selects the remaining number of deeds 160 for the player.

One method to facilitate automatic selection is to indicate to a player which of the deeds 160 will be selected for the player once the time expires. For example, in the illustrated embodiment, deeds 166*a*, 166*b*, and 166*c* are slightly raised from the other deeds 160. The raised deeds 166*a-c* indicate to a player that these deeds 166*a-c* will be selected by the gaming system 128 for the player if the player does not choose otherwise. In addition to the raised deeds 166*a-c*, a highlighted, raised deed 164 may also be provided to indicate that the next player selection will void the automatic selection of the highlighted, raised deed 164 by the gaming system 128.

Thus, for embodiments where five deed selections are required, five deeds among the plurality of deeds will be randomly selected and raised by the gaming system 128, with one of the raised deeds being highlighted. Once a player chooses a first deed, the highlighted, raised deed will be lowered and one of the remaining four raised deeds will become the highlighted, raised deed. This process will continue until all five deeds are selected by the player or the predetermined time period has expired—at which time the remaining raised deeds will be automatically selected for the player.

One or more of the stations 152 has a communal value 168 associated therewith. When a deed 160 representing a particular one of the stations 152 is selected, the communal value 168 for that particular station 152 is increased for the player that selected the deed 160. Thus, the selection of one or more deeds allows a player to increase the award value of a particular station 152 if the station 152 is earned during the communal wagering game.

Figure 11A:
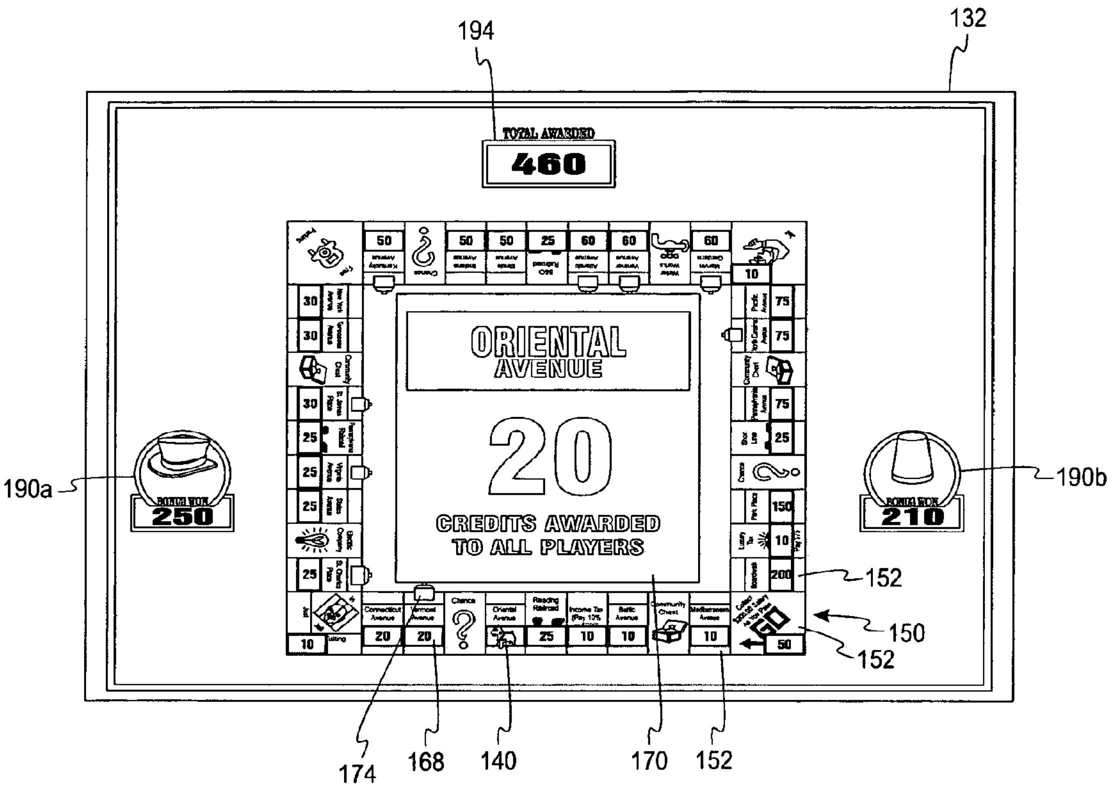
FIG. 11*a* is an illustration of a communal display, according to one embodiment of the present invention.
Figure 11B:
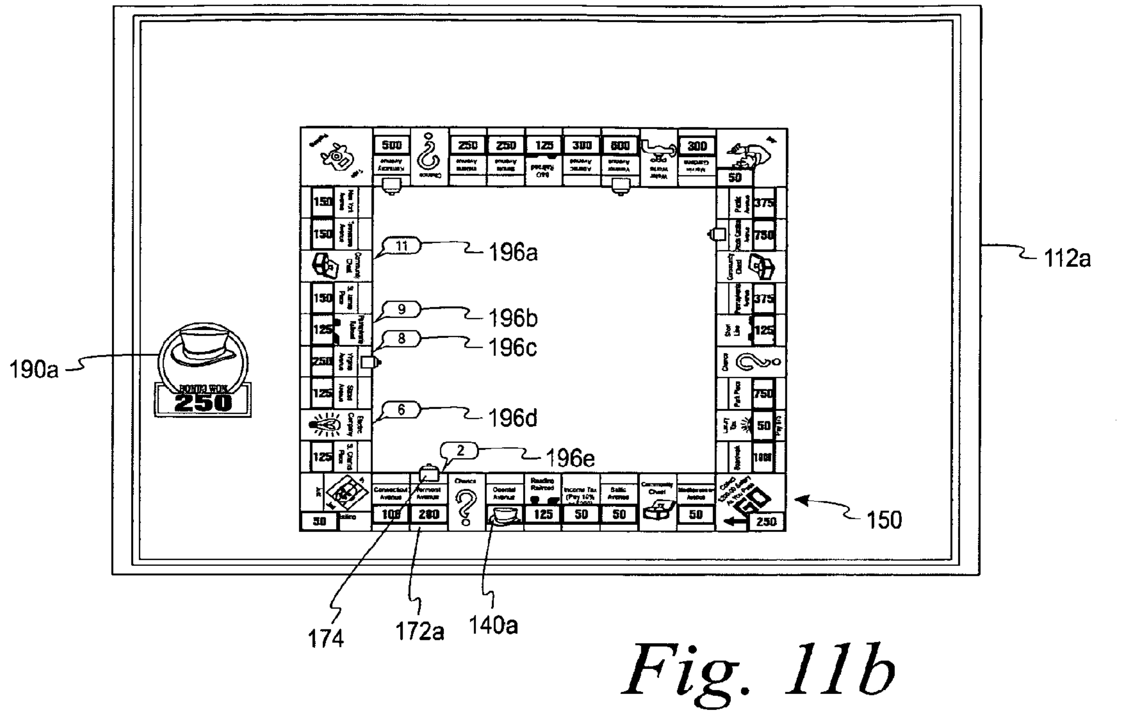
FIG. 11*b* is an illustration of a first individual game screen displayed on a video display while the communal game screen is displayed on a community display, according to one embodiment of the present invention.
Figure 11C:
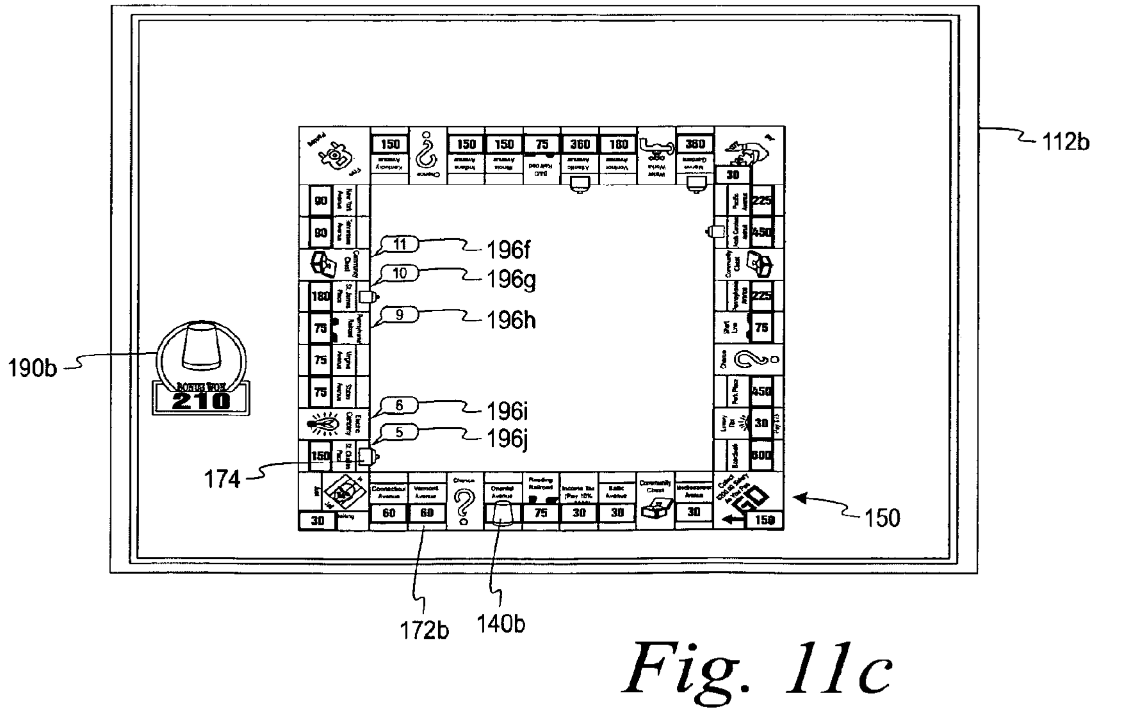
FIG. 11*c* is an illustration of a second individual game screen displayed on a video display while the communal game screen is displayed on a community display, according to one embodiment of the present invention.

Referring also to FIGS. 11*a-c*, another method for enhancing, and displaying the enhanced, award values is illustrated, according to one embodiment of the present invention. FIG. 11*a* illustrates a community display 132 for displaying the above-described communal wagering game. The community display 132 displays the trail 150 as well as the communal values 168 associated with one or more of the plurality of stations 152. The communal values 168 vary for the plurality of different stations 152 included within the trail 150.

As discussed above, when the community event is initiated, a determination is made as to which players at the plurality of gaming machines 110*a-f* are eligible to participate in the communal wagering game. A determination is also made as to whether to apply a value-enhancement parameter to the player's gaming machine and if so, what the value of the parameter will be. For example, in one embodiment the player's betting history prior to the initiation of the bonus event will determine the value of the player's value-enhancing parameter. In other embodiments, the length of the gaming session, total credits wagered, speed of play, credits earned, etc. can be used to determine the player's value-enhancing parameter.

The value-enhancing parameter enhances the communal values 168 associated with the stations 152 to arrive at a player value for the stations 152. The value-enhancing parameter can be, for example, a multiplier that is applied to each of the communal values 168 to increase the communal values 168 by the particular multiplier value (e.g., 1×, 2×, 3×). According to other embodiments, the value-enhancing parameter is a predetermined amount or selected from a predetermined range of amounts.

As illustrated in FIGS. 11*b-c*, the player values 172*a*, 172*b* are increased based on the determined value-enhancement parameter for each player. As illustrated in FIG. 11*b*, the value-enhancement parameter is a 5× multiplier and the first player values 172*a* displayed on the first video display 112*a* are five times greater than the communal values 168 displayed on the community display 132 in FIG. 11*a*. Similarly, in FIG. 11*c* the value-enhancement parameter is a 3× multiplier and the second player values 172*b* displayed on the second video display 112*b* are three times greater than the standard communal values 168.

In addition to the value-enhancement parameters increasing the communal values 168, a plurality of markers 174 (e.g. hotels) are utilized to designate the stations 152 for which deeds 160 were previously selected by the player. The player values 172*a*, 172*b* for those stations 152 for which the player selected a deed 160 (FIG. 10) are further increased. In the illustrated example, the selection of a deed 160, as described with respect to FIG. 10, results in a 2× multiplier being applied to the communal value 168 for the selected properties. This 2× multiplier is in addition to the value-enhancing parameters that were previously applied to the communal values 168, and creates an added-value station along the trail 150. Each of the stations 152 designated with a marker 174 are referred to as added-value stations.

As discussed above with respect to FIG. 4, in the MONOPOLY ONCE AROUND™ game, a game token 140 begins at a first station along a trail, such as the GO station on a MONOPOLY® board. The signage controller randomly generates a length of advancement (e.g., a number of spaces) that the token 140 will move along the trail 150. The signage controller continues to randomly generate lengths of advancement until the token 140 has completed a single circuit around the trail 150 so as to pass the GO station.

As illustrated in FIG. 11*a*, the token 140 has advanced to "ORIENTAL AVENUE" and the associated payout deed 170 is displayed to the player on the community display 132. The payout deed 170 displays the communal value 168 for the particular station 152 to the players, while each player is awarded their respective player values 172*a*, 172*b* for the station 152. Once the player values 172*a*, 172*b* have been awarded, the controller generates another length of advancement and the token 140 moves further along the trail 150. It should be noted that each player participating in the communal wagering game may be prompted to select an individualized token 140*a*, 140*b* (FIGS. 11*b-c*) that is displayed on the first and second video displays 112*a*, 112*b*, respectively.

The individualized tokens 140*a*, 140*b* may also be utilized to represent the player on the community display 132. For example, the community display may include a plurality of player-award meters 190*a*, 190*b* used to display the award accrued by the individual players. The player-award meters 190*a*, 190*b* are also displayed on the first and second video displays 112*a*, 112*b* respectively. A communal-award meter 194 for displaying the total award provided during the communal wagering game is also provided on the community display 132. The communal-award meter 194 displays the overall value of the awards that have been earned by the players over the course of the communal wagering game.

The first and second video displays 112*a*, 112*b* include a plurality of advancement identifiers 196*a-j* indicating the number of stations 152 the token 140 must advance to "land on" the indicated station 152. For example, the first video display 112*a* has advancement identifiers 196*a-e* identifying various stations 152 along the trail 150.

According to one embodiment, the advancement indicators 196*a-j* identify all of the marked properties and all of the special-event properties (as will be discussed with respect to FIGS. 12-13*b* below) reachable within the next length of advancement, which, in the illustrated example, is twelve stations (e.g., one roll of two dice). The advancement indicators 196*a-j* may assist in allowing a player to quickly identify what length of advancement they desire on the next "roll."

Figure 12:
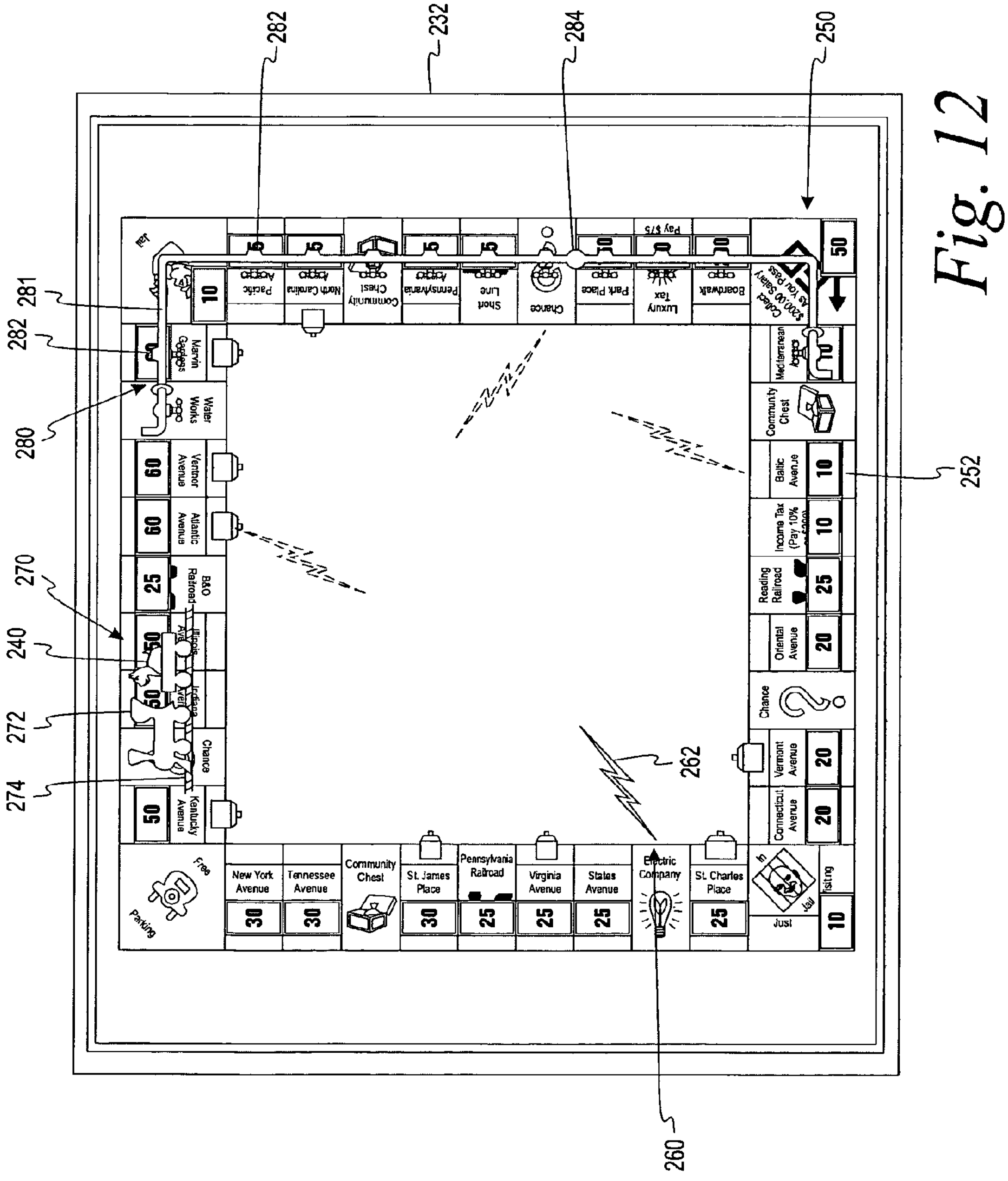
FIG. 12 is an illustration of a special-event game screen, according to one embodiment of the present invention.
Figure 13A:
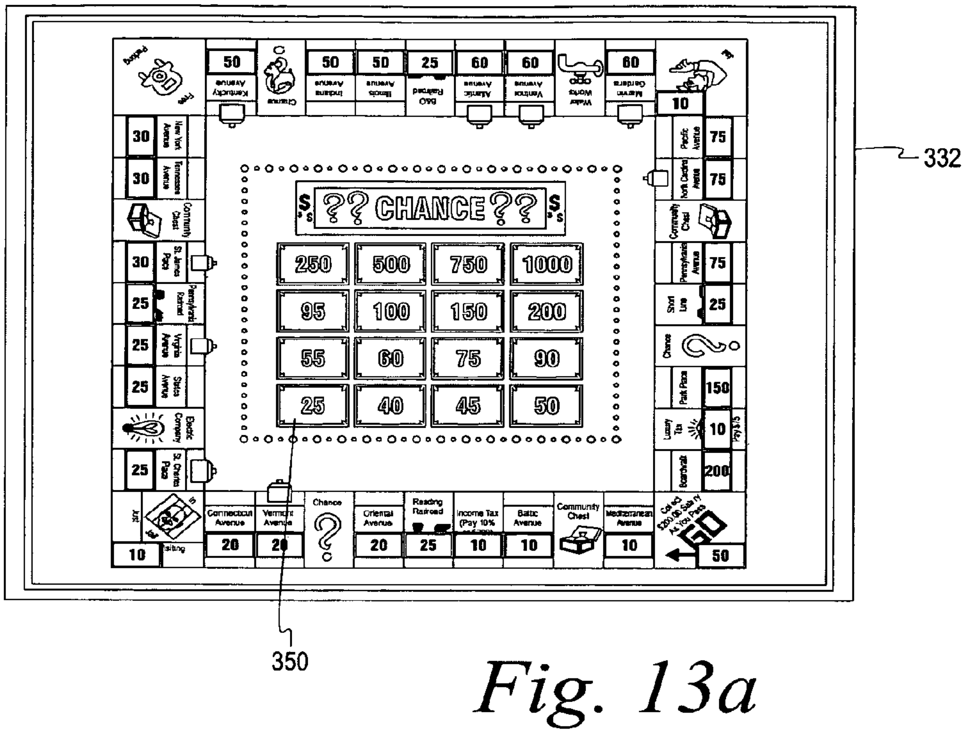
FIG. 13*a* is an illustration of an elimination-type game displayed on a community display, according to one embodiment of the present invention.
Figure 13B:
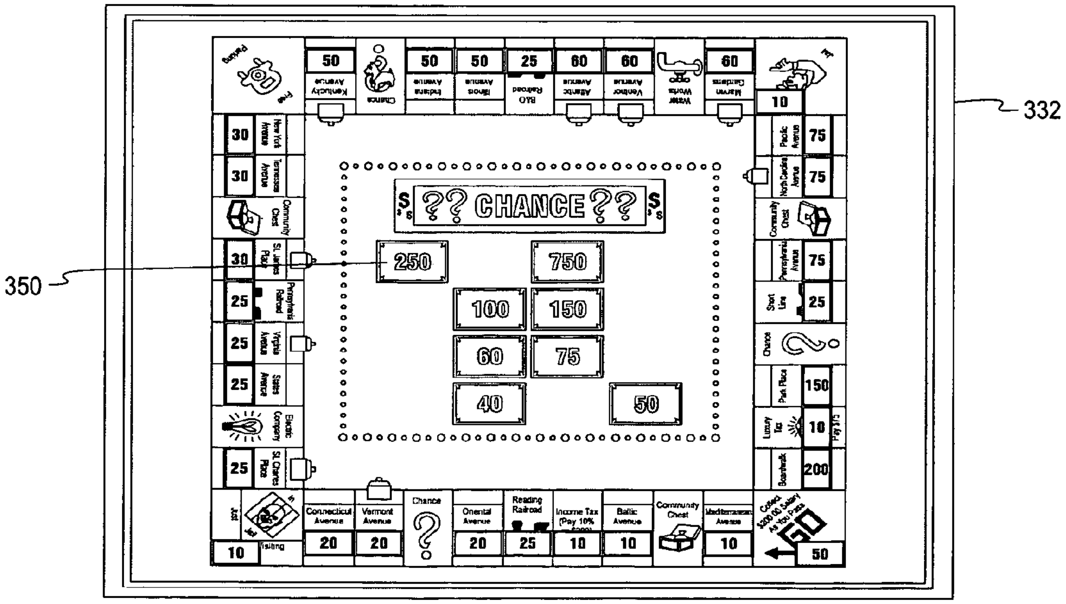
FIG. 13*b* is an illustration of the elimination-type game of FIG. 13*a* after several of a plurality of value-bearing symbols have been removed.

Turning now to FIGS. 12-13*b*, a plurality of special-feature elements will be detailed with respect to various embodiments of the present invention. FIG. 12 illustrates special-feature elements that award the participating players in the communal wagering game an award that is not associated with the special-feature element itself. When a special-feature element is achieved, a special-feature event is initiated and displayed on a community display 232.

For example, when a first special feature 260 is initiated (e.g., the "ELECTRIC COMPANY" feature), a station designator 262 appears within the trail 250. The station designator 262 moves around internal portion of the trail 250 pointing from station 252 to station 252 until finally selecting one of the other stations 252 along the trail 250. Once a station 252 has been selected by the first special feature 260, the player values associated with that station 252 are awarded to the individual players. In some embodiments, the player values are further increased when a special feature is initiated. For example, the first special feature 260 can apply an additional multiplier (e.g., a 2× multiplier) to the communal values 168 (FIG. 11*a*) and award the resulting player values.

A second special feature 270 (e.g., the "railroad" feature) can also be initiated. When a token 240 lands on a second special-feature element the second special feature 270 is initiated. The initiation of the second special feature 270 causes a locomotive 272 positioned on a railroad track 274 to be displayed on the community display 232. The locomotive 272 moves along the railroad track 274 and transports the token 240 back along the trail 250. The locomotive 272 eventually stops and the token 240 is "dropped off" at the station 252 where the locomotive 272 stops. The players are then awarded their individual player values associated with the station 252.

In addition, a third special feature 280 (e.g., the "WATER WORKS" feature) can also be initiated. The initiation of the third special feature 280 causes a pipe 281 to form over a plurality of stations 252. The pipe 281 includes a valve 282 located at each station 252. A bulge 284 in the pipe 281 indicates where the token 240 is moving within the pipe 281. The bulge 284 continues to move along the pipe 281 until one of the valves 282 opens and the token 240 is released at a particular station 252. The players are then awarded their individual player values associated with the station 252.

In both the second special feature 270 and the third special feature 280 the token 240 is actually moved along the trail 250, while in the first special feature 260, the token 240 remains stationary and only the station designator 262 moves. In some embodiments, the second special feature 270 and the third special feature 280 are capable of moving the token 240 anywhere along the trail 250 in either direction. In other embodiments, however, the second special feature 270 and the third special feature 280 are limited in the range and/or direction they can move the token. For example, in some embodiments, the second special feature 270 can only move the token 240 back in the direction from which it came and only regress the token 240 five or less stations 252. In some embodiments, the third special feature 280 can only advance the token 240 and only for up to twelve stations 252 (e.g., one roll of the dice).

Referring also to FIGS. 13*a-b*, a fourth special feature is displayed on a community display 332. The fourth special feature is an elimination-type feature that includes a plurality of value-bearing symbols 350 displayed on the community display 332, as illustrated in FIG. 13*a*. The value-bearing symbols 350 are removed one at a time—as illustrated in FIG. 13*b*—until only a single value-bearing symbol 350 remains. The value associated with the single remaining value-bearing symbol 350 is then awarded to each of the players participating in the communal wagering game. The value associated with the single remaining value-bearing symbol 350 may be enhanced by the value-enhancement parameters as discussed above. In some embodiments of the present invention, the elimination-type feature is initiated when the token 140 (FIG. 11*a*) advances to "CHANCE," "COMMUNITY CHEST," or "FREE PARKING." The values associated with the plurality of value-bearing symbols 350 may vary depending on which of the stations initiates the feature.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method for conducting a communal game, a plurality of players at a plurality of gaming machines participating in the communal game, the plurality of players participating and sharing game play of at least one communal outcome, the plurality of gaming machines including a first gaming machine and a second gaming machine, the plurality of players including a first player and a second player, the method comprising:

receiving, in response to inputs via a first input device of the first gaming machine, first wagers from the first player for respective plays of a first plurality of plays of a first wagering game, the first plurality of plays being played prior to conducting the communal game;

determining, by at least one of one or more processors, a first value-enhancement parameter for the first player, the first value-enhancement parameter incrementally increasing based on the first player's game play activity over the first plurality of plays;

receiving, in response to inputs via a second input device of the second gaming machine, second wagers from the second player for respective plays of a second plurality of plays of a second wagering game, the second plurality of plays being played prior to conducting the communal game;

determining, by at least one of the one or more processors, a second value-enhancement parameter for the second player, the second value-enhancement parameter incrementally increasing based on the second player's game play activity over the second plurality of plays;

enabling, by at least one of the one or more processors, the first gaming machine and the second gaming machine to participate in the communal game;

determining, by at least one of the one or more processors, a communal outcome for at least one communal play of the communal game in which both the first gaming machine and the second gaming machine participate and share gameplay;

displaying, by at least one of the one or more display devices, the outcome of the communal play; and awarding, by at least one of the one or more processors, a first award from the communal game to the first player, the first award being determined in part by the first value-enhancement parameter and the outcome.

2. The method of claim 1, wherein the outcome of the communal play is a randomly selected outcome of the communal game, the randomly selected outcome including a plurality of game play symbols.

3. The method of claim 1, wherein the first award is determined by applying the first value-enhancement parameter to a base award of the first player from the communal game, the base award being determined by the outcome.

4. The method of claim 1, wherein the awarding includes awarding a second award from the communal game to the second player, the second award being determined in part by the second-value enhancement parameter.

5. The method of claim 4, wherein the first award is determined by applying the first value-enhancement parameter to a base award of the first player from the communal game, and wherein the second award is determined by applying the second value-enhancement parameter to a base award of the second player from the communal game.

6. The method of claim 5, wherein the base award of the first player is the same as the base award of the second player, the base award being determined by the outcome.

7. The method of claim 5, wherein the first and second value-enhancement parameters are respective multipliers for multiplying the first and second players' respective base awards from the communal game.

8. The method of claim 1, wherein the first value-enhancement parameter is different from the second value-enhancement parameter.

9. A system for conducting a communal game at a plurality of gaming machines, the system comprising:

a first gaming machine having a first input device;

a second gaming machine having a second input device;

one or more display devices;

one or more memory devices storing instructions that, when executed by the at least one or more processors, cause the gaming system to:

receive first wagers, via the first input device at the first gaming machine, from a first player for playing, respectively, a first plurality of plays of a first wagering game, the first plurality of plays being played prior to conducting the communal game, determine a first value-enhancement parameter for the first player, the first value-enhancement parameter incrementally increasing based on the first player's game play activity over the first plurality of plays, receive second wagers, via the second input device at the second gaming machine, from a second player for playing, respectively, a second plurality of plays of a second wagering game, the second plurality of plays being played prior to conducting the communal game, determine a second value-enhancement parameter for the second player, the second value-enhancement parameter incrementally increasing based on the second player's game play activity over the second plurality of plays, enable the first gaming machine and the second gaming machine to participate in the communal game;

determine at least one communal outcome of communal play in which the first gaming machine and the second gaming machine participate and share game play;

display on at least one of the one or more display devices the at least one communal outcome, and award a first award from the communal game to the first player, the first award being determined in part by the first value-enhancement parameter.

10. The system of claim 9, wherein the communal outcome of the communal play is a randomly selected outcome of the communal game, the randomly selected outcome including a plurality of game play symbols.

11. The system of claim 9, wherein the first award is determined by applying the first value-enhancement parameter to a base award of the first player from the communal game.

12. The system of claim 9, wherein the one or more memory devices further store instructions that, when executed by the at least one or more processors, cause the gaming system to award a second award from the communal game to the second player, the second award being determined in part by the second-value enhancement parameter.

13. The system of claim 12, wherein the first award is determined by applying the first value-enhancement parameter to a base award of the first player from the communal game, and wherein the second award is determined by applying the second value-enhancement parameter to a base award of the second player from the communal game.

14. The system of claim 13, wherein the first player's base award and the second player's base award are the same.

15. The system of claim 13, wherein the first and second value-enhancement parameters are respective multipliers for multiplying the first and second players' respective base awards from the communal game.

16. The system of claim 9, wherein the first value-enhancement parameter is different from the second value-enhancement parameter.

17. One or more machine-readable non-transitory storage media including instructions which, when executed by one or more processors, cause the one or more processors to perform operations comprising:

receiving, in response to inputs via a first input device of the first gaming machine, first wagers from the first player for respective plays of a first plurality of plays of a first wagering game, the first plurality of plays being played prior to conducting the communal game;

determining, by at least one of one or more processors, a first value-enhancement parameter for the first player, the first value-enhancement parameter incrementally increasing based on the first player's game play activity over the first plurality of plays;

receiving, in response to inputs via a second input device of the second gaming machine, second wagers from the second player for respective plays of a second plurality of plays of a second wagering game, the second plurality of plays being played prior to conducting the communal game;

determining, by at least one of the one or more processors, a second value-enhancement parameter for the second player, the second value-enhancement parameter incrementally increasing based on the second player's game play activity over the second plurality of plays;

enabling, by at least one of the one or more processors, the first gaming machine and the second gaming machine to participate in the communal game;

determining, by at least one of the one or more processors, a communal outcome for at least one communal play of the communal game in which both the first gaming machine and the second gaming machine participate and share gameplay;

displaying, by at least one of the one or more display devices, the outcome of the communal play; and awarding, by at least one of the one or more processors, a first award from the communal game to the first player, the first award being determined in part by the first value-enhancement parameter.

18. The machine-readable non-transitory storage media of claim 17, wherein the outcome of the communal play is a randomly selected outcome of the communal game, the randomly selected outcome including a plurality of game play symbols.

19. The machine-readable non-transitory storage media of claim 17, wherein the first award is determined by applying the first value-enhancement parameter to a base award of the first player from the communal game.

20. The machine-readable non-transitory storage media of claim 17, wherein the awarding includes awarding a second award from the communal game to the second player, the second award being determined in part by the second-value enhancement parameter.

21. The machine-readable non-transitory storage media of claim 20, wherein the first award is determined by applying the first value-enhancement parameter to a base award of the first player from the communal game, and wherein the second award is determined by applying the second value-enhancement parameter to a base award of the second player from the communal game.

22. The machine-readable non-transitory storage media of claim 21, wherein the first player's base award and the second player's base award are the same.

23. The machine-readable non-transitory storage media of claim 21, wherein the first and second value-enhancement parameters are respective multipliers for multiplying the first and second players' respective base awards from the communal game.

24. The machine-readable non-transitory storage media of claim 17, wherein the first value-enhancement parameter is different from the second value-enhancement parameter.

* * * * *